United States Patent
Noh et al.

(10) Patent No.: US 12,146,958 B2
(45) Date of Patent: Nov. 19, 2024

(54) METHOD OF ANALYZING A SHAPE OF AN OBJECT AND AN APPARATUS FOR TRACKING AN OBJECT USING A LIDAR SENSOR

(71) Applicants: HYUNDAI MOTOR COMPANY, Seoul (KR); KIA CORPORATION, Seoul (KR)

(72) Inventors: Mi Rim Noh, Jeonju-si (KR); Byoung Kwang Kim, Yongin-si (KR); Ju Heon Baeg, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 657 days.

(21) Appl. No.: 17/390,457

(22) Filed: Jul. 30, 2021

(65) Prior Publication Data
US 2022/0179076 A1    Jun. 9, 2022

(30) Foreign Application Priority Data
Dec. 9, 2020    (KR) .......................... 10-2020-0171561

(51) Int. Cl.
*G01S 17/42*    (2006.01)
*G01B 11/24*    (2006.01)
(Continued)

(52) U.S. Cl.
CPC .............. *G01S 17/42* (2013.01); *G01B 11/24* (2013.01); *G01S 7/4802* (2013.01);
(Continued)

(58) Field of Classification Search
CPC ...... G01S 17/42; G01S 7/4802; G01S 7/4808; G01S 17/66; G01S 17/89; G01S 17/931; G01S 17/08; G01S 7/354; G01S 17/4802; G06V 20/58; G06V 20/64; G06V 20/56; G01B 11/24; G05D 1/024; G06T 7/11; G06T 2207/10028; G06T 7/70; G06T 2207/30261; G06T 2207/30248; G06T 2207/30252
See application file for complete search history.

(56) References Cited

U.S. PATENT DOCUMENTS

2015/0158489 A1*    6/2015    Oh ........................ B60W 30/09
                                                     701/41

OTHER PUBLICATIONS

Nyström Johansson, Tobias, and Oscar Wellenstam. "LiDAR clustering and shape extraction for automotive applications." (2017). (Year: 2017).*

(Continued)

*Primary Examiner* — Yoshihisa Ishizuka
*Assistant Examiner* — Carter W Ferrell
(74) *Attorney, Agent, or Firm* — Lempia Summerfield Katz LLC

(57) ABSTRACT

A method of analyzing the shape of an object using a LiDAR sensor includes determining the first to $M^{th}$ shapes of first to $M^{th}$ layers (where M is a positive integer of 2 or more) related to a target object using clustered LiDAR points and analyzing the determined first to $M^{th}$ shapes according to a predetermined priority to determine the shape of the target object.

20 Claims, 23 Drawing Sheets

(51) Int. Cl.
G01S 7/48 (2006.01)
G01S 17/66 (2006.01)
G01S 17/89 (2020.01)
G01S 17/931 (2020.01)
G06V 20/56 (2022.01)

(52) U.S. Cl.
CPC ............ *G01S 7/4808* (2013.01); *G01S 17/66* (2013.01); *G01S 17/89* (2013.01); *G01S 17/931* (2020.01); *G06V 20/56* (2022.01)

(56) References Cited

OTHER PUBLICATIONS

Wender, Stefan, et al. "Classification of laserscanner measurements at intersection scenarios with automatic parameter optimization." IEEE Proceedings. Intelligent Vehicles Symposium, 2005.. IEEE, 2005. (Year: 2005).*

Kim, et al. "L-Shape Model Switching-Based Precise Motion Tracking of Moving Vehicles Using Laser Scanners" IEEE Transactions on Intelligent Transportation Systems, vol. 19, No. 2, Feb. 2018 (16 pages).

* cited by examiner t+1

METHOD OF ANALYZING A SHAPE OF AN OBJECT AND AN APPARATUS FOR TRACKING AN OBJECT USING A LIDAR SENSOR

This application claims the benefit of priority to Korean Patent Application No. 10-2020-0171561, filed on Dec. 9, 2020, which is hereby incorporated by reference as if fully set forth herein.

BACKGROUND

Field of the Disclosure

The present disclosure relates to a method of analyzing the shape of an object and an apparatus for tracking an object using a LiDAR sensor.

Discussion of the Related Art

Information about a target vehicle may be acquired using a light detection and ranging (LiDAR) sensor. An autonomous driving function of a vehicle equipped with a LiDAR sensor (hereinafter referred to as a "host vehicle") may be assisted using the acquired information. However, when information about a target vehicle, which is acquired using a LiDAR sensor, is incorrect, the reliability of the host vehicle may be deteriorated. Therefore, research for solving this problem is underway.

SUMMARY

Accordingly, the present disclosure is directed to a method of analyzing the shape of an object and an apparatus for tracking an object using a LiDAR sensor that substantially obviate one or more problems due to limitations and disadvantages of the related art.

The present disclosure provides a method of analyzing the shape of an object and an apparatus for tracking an object using a LiDAR sensor that are capable of accurately analyzing the shape of a dynamic object.

However, the objects to be accomplished by the present disclosure are not limited to the above-mentioned objects. Other objects not mentioned herein should be clearly understood by those having ordinary skill in the art from the following description.

A method of analyzing the shape of an object using a LiDAR sensor according to an embodiment may include: (a) determining shapes of all of first to $M^{th}$ layers (where M is a positive integer of 2 or more) related to a target object using clustered LiDAR points; and (b) analyzing the determined shapes according to a predetermined priority to determine the shape of the target object.

For example, the shape of the $m^{th}$ layer (where $1 \leq m \leq M$) among the first to $M^{th}$ layers may be determined in step (a). Step (a) may include (a1) searching for the break point located farthest from a line segment connecting a first end point and a second end point, among LiDAR points included in the $m^{th}$ layer. Step (a) may also include (a2) assigning a shape flag to the $m^{th}$ layer using at least one of a first line segment connecting the first end point and the break point, a second line segment connecting the second end point and the break point, first LiDAR points located near the first line segment, or second LiDAR points located near the second line segment.

For example, step (a2) may include analyzing the distribution of the first LiDAR points and the second LiDAR points in the $m^{th}$ layer and assigning a break flag to the $m^{th}$ layer as the shape flag using the result of the analyzing. The break flag may indicate that a possibility that the target object included in the $m^{th}$ layer is a dynamic object is low.

For example, the assigning the break flag to the $m^{th}$ layer may include calculating a first average value of first distances between the first line segment and the first LiDAR points and calculating a first variance of the first distances using the first average value. The assigning the break flag to the $m^{th}$ layer may also include calculating a second average value of second distances between the second line segment and the second LiDAR points and calculating a second variance of the second distances using the second average value. The assigning the break flag to the $m^{th}$ layer may also include assigning the break flag to the $m^{th}$ layer when each of the first variance and the second variance is greater than a variance threshold value.

For example, step (a2) may further include temporarily assigning an L-shaped flag or an I-shaped flag to the $m^{th}$ layer as the shape flag in consideration of the size of a shape box of the $m^{th}$ layer including the first and second line segments when each of the first variance and the second variance is not greater than the variance threshold value. Step (a2) may further include finally assigning the L-shaped flag or the I-shaped flag to the $m^{th}$ layer using at least one of the first line segment, the second line segment, the first LiDAR points, or the second LiDAR points in the L-shaped flag or the I-shaped flag temporarily assigned to the $m^{th}$ layer.

For example, the temporarily assigning the L-shaped flag or the I-shaped flag to the $m^{th}$ layer may include temporarily assigning the L-shaped flag or the I-shaped flag to the $m^{th}$ layer using at least one of the length or the width of the shape box.

For example, the temporarily assigning the L-shaped flag or the I-shaped flag to the $m^{th}$ layer may include temporarily assigning the I-shaped flag to the $m^{th}$ layer when the width of the shape box falls within a first threshold width range and temporarily assigning the L-shaped flag to the $m^{th}$ layer when the width of the shape box falls within a second threshold width range. The first threshold width range may have a range of a first minimum value to a first maximum value, and the second threshold width range may have a range of a second minimum value to a second maximum value. The second minimum value may be greater than or equal to the first maximum value.

For example, the finally assigning the L-shaped flag to the $m^{th}$ layer may include selecting the longer line segment from among the first line segment and the second line segment as a reference line segment and may include selecting the shorter line segment from among the first line segment and the second line segment as a non-reference line segment. The finally assigning the L-shaped flag to the $m^{th}$ layer may also include finally assigning the L-shaped flag to the $m^{th}$ layer when the length of the reference line segment is greater than or equal to a threshold length, when the average and the variance of the reference line segment are less than a reference threshold average and a reference threshold variance, respectively, when the average and the variance of the non-reference line segment are less than a non-reference threshold average and a non-reference threshold variance, respectively, when LiDAR points are present in each of i (where i is a positive integer of 1 or more) regions formed by division in the direction intersecting the reference line segment, when the spacing distance between neighboring outer LiDAR points located in the regions is less than a threshold spacing distance, and when the angle between the first line segment and the second line segment is greater than a first angle and less than a second angle.

For example, the finally assigning the I-shaped flag to the $m^{th}$ layer may include selecting the longer line segment from among the first line segment and the second line segment as a reference line segment. The finally assigning the I-shaped flag to the $m^{th}$ layer may also include finally assigning the I-shaped flag to the $m^{th}$ layer when the average and the variance of the reference line segment are less than a reference threshold average and a reference threshold variance, respectively, and when the spacing distance between outer LiDAR points located in j (where is a positive integer of 1 or more) regions formed by division in the direction intersecting the reference line segment is less than a threshold spacing distance.

For example, the method may further include checking whether the $m^{th}$ layer is a layer related to the roof of the target object. When the $m^{th}$ layer is a layer related to the roof of the target object, the non-reference threshold average and the non-reference threshold variance may be increased and the non-reference threshold average and the non-reference threshold variance may be used to determine whether to finally assign the L-shaped flag to the $m+1^{th}$ layer.

For example, the checking whether the $m^{th}$ layer is a layer related to the roof of the target object may include: checking whether the first ratio of the length of the shape box of the $m^{th}$ layer to the length of a clustering box related to the target object is less than a first threshold ratio; searching for a peak point in the shape flag finally assigned to the $m^{th}$ layer when the first ratio is less than the first threshold ratio; and determining that the $m^{th}$ layer is a layer related to the roof when the second ratio of the length from the peak point to the middle of the clustering box to half the length of the clustering box is less than a second threshold ratio.

For example, the searching for the peak point may include: determining the LiDAR point located farthest from the shorter line segment among the first line segment and the second line segment to be the peak point when the L-shaped flag is finally assigned to the $m^{th}$ layer; and determining the break point to be the peak point when the I-shaped flag is finally assigned to the $m^{th}$ layer.

For example, the determining the shape of the target object according to the predetermined priority may include determining that the shape of the target object is unrecognizable when there is a layer to which the break flag has been assigned among the first to $M^{th}$ layers. The determining the shape of the target object according to the predetermined priority may also include determining that the shape of the target object is an L shape when there is no layer to which the break flag has been assigned and there is a layer to which the L-shaped flag has been assigned among the first to $M^{th}$ layers. The determining the shape of the target object according to the predetermined priority may also include determining that the shape of the target object is an I shape when there is no layer to which any one of the break flag and the L-shaped flag has been assigned and there is a layer to which the I-shaped flag has been assigned among the first to $M^{th}$ layers. The determining the shape of the target object according to the predetermined priority may also include determining that the shape of the target object is unrecognizable when there is no layer to which any one of the break flag, the L-shaped flag and the I-shaped flag has been assigned among the first to $M^{th}$ layers.

An apparatus for tracking an object using a LiDAR sensor according to another embodiment may include a LiDAR sensor configured to acquire a point cloud related to a target object, a clustering unit configured to cluster the point cloud, and a shape analysis unit configured to analyze the shape of the target object using LiDAR points clustered in the point cloud. The shape analysis unit may include a layer shape determination unit configured to determine shapes of all of first to $M^{th}$ layers (where M is a positive integer of 2 or more) related to the target object using the clustered LiDAR points and a target shape determination unit configured to analyze the determined shapes according to a predetermined priority to determine the shape of the target object.

For example, the layer shape determination unit may determine the shape of the $m^{th}$ layer (where $1 \leq m \leq M$) among the first to $M^{th}$ layers. The layer shape determination unit may include a determination preparation unit configured to search for the break point located farthest from a line segment connecting a first end point and a second end point, among LiDAR points included in the $m^{th}$ layer, and to generate a first line segment connecting the first end point and the break point and a second line segment connecting the second end point and the break point. The layer shape determination unit may also include a flag assignment unit configured to assign a shape flag to the $m^{th}$ layer using at least one of the first line segment, the second line segment, first LiDAR points located near the first line segment, or second LiDAR points located near the second line segment.

For example, the layer shape determination unit may further include an object analysis unit configured to analyze the distribution of the first LiDAR points and the second LiDAR points in the $m^{th}$ layer and to assign a break flag to the $m^{th}$ layer as the shape flag using the result of the analysis. The break flag may indicate that a possibility that the target object included in the $m^{th}$ layer is a dynamic object is low.

For example, the object analysis unit may include a first variance calculation unit configured to calculate the first variance of the first distances between the first line segment and the first LiDAR points using the first average value of the first distances. The object analysis unit may also include a second variance calculation unit configured to calculate the second variance of the second distances between the second line segment and the second LiDAR points using the second average value of the second distances. The object analysis unit may also include a variance comparison unit configured to compare each of the first variance and the second variance with a variance threshold value and to assign the break flag to the $m^{th}$ layer in response to the result of the comparison.

For example, the flag assignment unit may include a temporary flag assignment unit configured to temporarily assign an L-shaped flag or an I-shaped flag to the $m^{th}$ layer as the shape flag in consideration of the size of the shape box of the $m^{th}$ layer including the first and second line segments in response to the result of the comparison by the variance comparison unit. The flag assignment unit may also include a final flag assignment unit configured to finally assign the L-shaped flag or the I-shaped flag to the $m^{th}$ layer using at least one of the first line segment, the second line segment, the first LiDAR points, or the second LiDAR points in the L-shaped flag or the I-shaped flag temporarily assigned to the $m^{th}$ layer.

For example, the temporary flag assignment unit may temporarily assign the L-shaped flag or the I-shaped flag to the $m^{th}$ layer using at least one of the length or the width of the shape box.

For example, the temporary flag assignment unit may include a first width comparison unit configured to compare the width of the shape box with a first threshold width range and to temporarily assign the I-shaped flag to the $m^{th}$ layer in response to the result of the comparison. The temporary flag assignment unit may also include a second width comparison unit configured to compare the width of the shape box with a second threshold width range and to temporarily assign the L-shaped flag to the $m^{th}$ layer in response to the result of the comparison. The first threshold width range may have a range of a first minimum value to a first maximum value and the second threshold width range may have a range of a second minimum value to a second maximum value. The second minimum value may be greater than or equal to the first maximum value.

For example, the final flag assignment unit may include a reference line segment selection unit configured to select the longer line segment from among the first line segment and the second line segment as a reference line segment and to select the shorter line segment from among the first line segment and the second line segment as a non-reference line segment. The final flag assignment unit may also include a first flag assignment analysis unit configured to finally assign the L-shaped flag to the $m^{th}$ layer when the length of the reference line segment is greater than or equal to a threshold length, when the average and the variance of the reference line segment are less than a reference threshold average and a reference threshold variance, respectively, when the average and the variance of the non-reference line segment are less than a non-reference threshold average and a non-reference threshold variance, respectively, when LiDAR points are present in each of i (where i is a positive integer of 1 or more) regions formed by division in the direction intersecting the reference line segment, when the spacing distance between neighboring outer LiDAR points located in the regions is less than a threshold spacing distance, and when the angle between the first line segment and the second line segment is greater than a first angle and less than a second angle.

For example, the final flag assignment unit may further include a second flag assignment analysis unit configured to finally assign the I-shaped flag to the $m^{th}$ layer when the average and the variance of the reference line segment are less than a reference threshold average and a reference threshold variance, respectively, and when the spacing distance between outer LiDAR points located in j (where j is a positive integer of 1 or more) regions formed by division in the direction intersecting the reference line segment is less than a threshold spacing distance.

For example, the layer shape determination unit may further include a roof layer inspection unit configured to check whether the $m^{th}$ layer is a layer related to the roof of the target object and to output the result of the checking. The first flag assignment analysis unit may increase the non-reference threshold average and the non-reference threshold variance in response to the result of the checking by the roof layer inspection unit. The non-reference threshold average and the non-reference threshold variance may be used to determine whether to finally assign the L-shaped flag to the $m+1^{th}$ layer.

For example, the roof layer inspection unit may check whether the first ratio of the length of the shape box of the $m^{th}$ layer to the length of a clustering box related to the target object is less than a first threshold ratio, may search for the peak point in the shape flag finally assigned to the $M^{th}$ layer, and may check whether the second ratio of the length from the peak point to the middle of the clustering box to half the length of the clustering box is less than a second threshold ratio.

For example, the roof layer inspection unit may determine the LiDAR point located farthest from the shorter line segment among the first line segment and the second line segment to be the peak point or may determine the break point to be the peak point in response to the result of comparison between the first ratio and the first threshold ratio and the result of final assignment of the shape flag by the final flag assignment unit.

For example, the target shape determination unit may include a first flag inspection unit configured to check whether there is a layer to which the break flag has been assigned among the first to $M^{th}$ layers. The target shape determination unit may also include a second flag inspection unit configured to check whether there is a layer to which the L-shaped flag has been assigned in response to the result of the checking by the first flag inspection unit. The target shape determination unit may further include a third flag inspection unit configured to check whether there is a layer to which the I-shaped flag has been assigned in response to the result of the checking by the second flag inspection unit. The target shape determination unit may also include a final shape output unit configured to determine the shape of the target object to be an unrecognizable shape, an L shape, or an I shape in response to the results of the checking by the first to third flag inspection units.

BRIEF DESCRIPTION OF THE DRAWINGS

Arrangements and embodiments are described in detail with reference to the following drawings, in which like reference numerals refer to like elements and wherein.

DETAILED DESCRIPTION OF THE INVENTION

Figure 1:
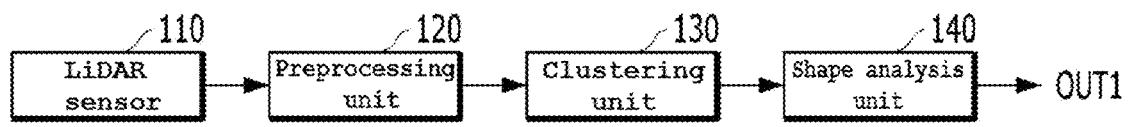
FIG. 1 is a schematic block diagram of an object-tracking apparatus using a LiDAR sensor according to an embodiment of the present disclosure.

The present disclosure is now described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure is more thorough and complete and more fully conveys the scope of the disclosure to those having ordinary skill in the art.

It should be understood that when an element is referred to as being "on" or "under" another element, it may be directly on/under the element or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements. When a component, device, element, or the like of the present disclosure is described as having a purpose or performing an operation, function, or the like, the component, device, or element should be considered herein as being "configured to" meet that purpose or to perform that operation or function. The present disclosure describes various components of an object tracking apparatus as units, such as but not limited to: a layer shape determination unit; a target shape determination unit; a determination preparation unit; an object analysis unit; a flag assignment unit; a roof layer inspection unit; a first variance calculation unit; a second variance calculation unit; a variance comparison unit; a temporary flag assignment unit; a final flag assignment unit; first and second width comparison units; a reference line segment selection unit; a first flag assignment analysis unit; a second flag assignment analysis unit; first to third flag inspection units; and a final shape output unit. Each of these units may separately embody or be included with a processor and a memory, such as a non-transitory computer readable media, as part of the apparatus.

Hereinafter, a method 200 of analyzing the shape of an object and an apparatus 100 for tracking an object using a LiDAR sensor according to embodiments are described with reference to the accompanying drawings. The method 200 of analyzing the shape of an object and the apparatus 100 for tracking an object using a LiDAR sensor are described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. In other words, the x-axis, the y-axis, and the z-axis may intersect each other obliquely.

FIG. 1 is a schematic block diagram of an object-tracking apparatus 100 using a LiDAR sensor according to an embodiment.

The object-tracking apparatus 100 shown in FIG. 1 may include a light detection and ranging (LiDAR) sensor 110, a preprocessing unit 120, a clustering unit 130, and a shape analysis unit 140.

The LiDAR sensor 110 may acquire a point cloud related to a target object and may output the acquired point cloud to the preprocessing unit 120 as LiDAR data.

The preprocessing unit 120 may preprocess the LiDAR data. To this end, the preprocessing unit 120 may perform calibration to match the coordinates between the LiDAR sensor 110 and a vehicle equipped with the LiDAR sensor 110 (hereinafter referred to as a "host vehicle"). In other words, the preprocessing unit 120 may convert the LiDAR data into data suitable for the reference coordinate system in consideration of the positional angle at which the LiDAR sensor 110 is mounted to the host vehicle. In addition, the preprocessing unit 120 may perform filtering to remove points having low intensity or reflectance using intensity or confidence information of the LiDAR data. In addition, the preprocessing unit 120 may remove data reflected from the host vehicle. In other words, since there is a region that is shielded by the body of the host vehicle depending on the mounting position and the field of view of the LiDAR sensor 110, the preprocessing unit 120 may remove data reflected from the body of the host vehicle using the reference coordinate system.

The clustering unit 130 may group the point cloud, which is the LiDAR data composed of a plurality of points related to the object acquired using the LiDAR sensor 110, into meaningful units according to a predetermined criterion. In other words, the clustering unit 130 may cluster the point cloud using the result of the preprocessing by the preprocessing unit 120 and may output the clustered LiDAR points to the shape analysis unit 140.

The shape analysis unit 140 may analyze the shape of a target object using the clustered LiDAR points of the point cloud and may output the result of the analysis through an output terminal OUT1.

Figure 2:
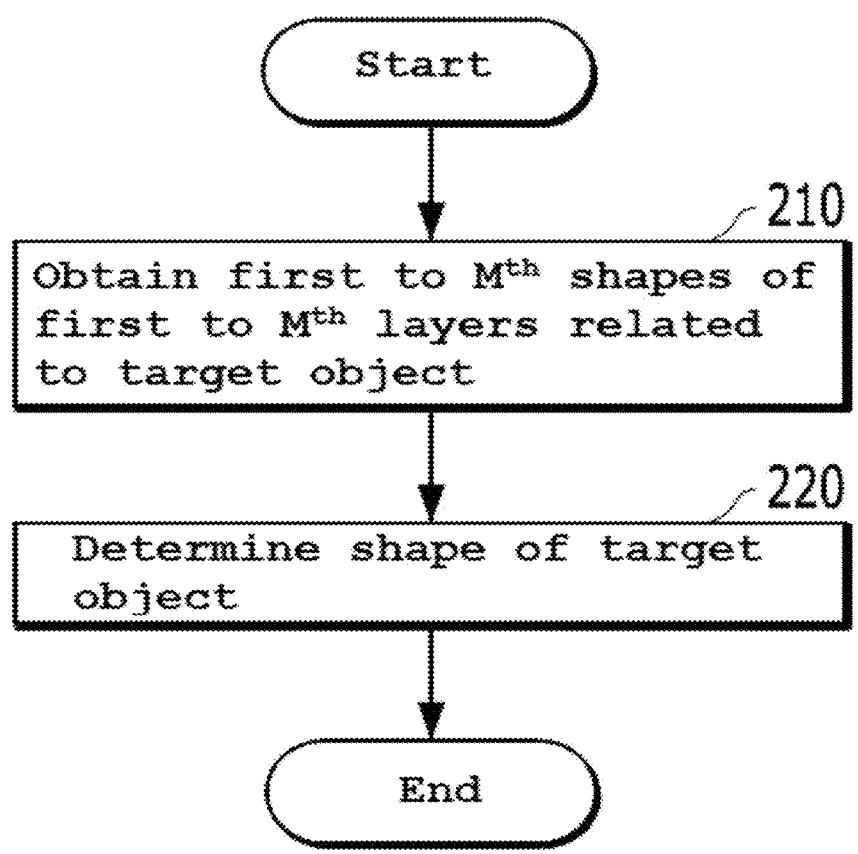
FIG. 2 is a flowchart of a method of analyzing the shape of an object using a LiDAR sensor according to an embodiment of the present disclosure.

FIG. 2 is a flowchart of a method 200 of analyzing the shape of an object using a LiDAR sensor according to an embodiment.

The shape analysis unit 140 shown in FIG. 1 may perform the shape analysis method 200 shown in FIG. 2, but the embodiment is not limited thereto. In other words, according to another embodiment, the shape analysis method 200 shown in FIG. 2 may be performed by an object-tracking apparatus configured differently from the object-tracking apparatus 100 shown in FIG. 1. In other words, the method 200 shown in FIG. 2 is not limited to any specific type of operation performed by the LiDAR sensor 110, the presence or absence of the preprocessing unit 120, any specific type of preprocessing performed by the preprocessing unit 120, or any specific type of clustering performed by the clustering unit 130 in the apparatus shown in FIG. 1.

Figure 3:
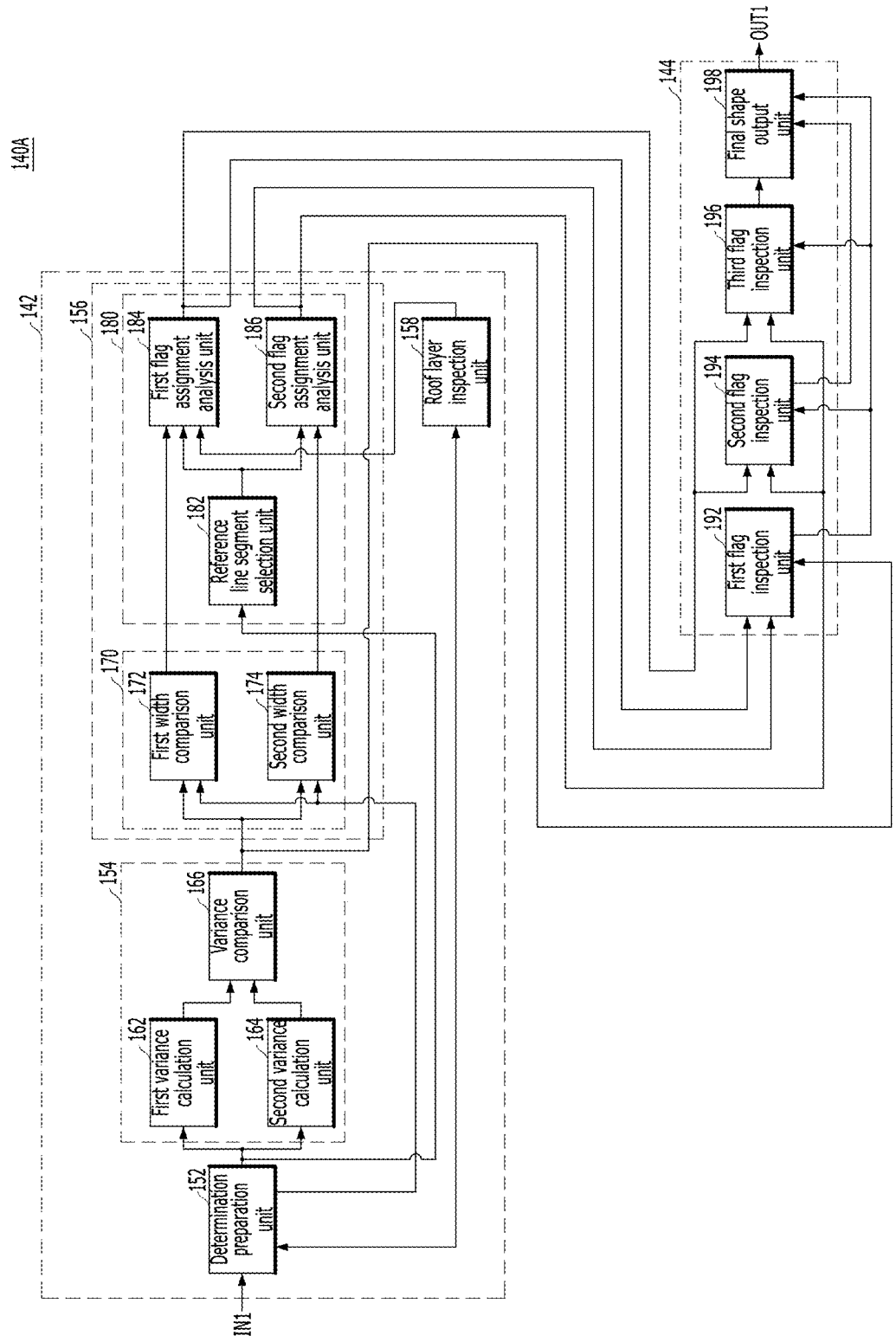
FIG. 3 is a block diagram of an embodiment of the shape analysis unit shown in FIG. 1.

FIG. 3 is a block diagram of an embodiment 140A of the shape analysis unit 140 shown in FIG. 1.

Hereinafter, to better understand the disclosure, the object shape analysis method 200 according to the embodiment is described as being performed by the shape analysis unit 140A shown in FIG. 3, but the embodiment is not limited thereto. In other words, according to another embodiment, the object shape analysis method 200 according to the embodiment may also be performed by a shape analysis unit configured differently from the shape analysis unit 140A shown in FIG. 3.

The shape analysis unit 140A shown in FIG. 3 may include a layer shape determination unit 142 and a target shape determination unit 144.

The layer shape determination unit 142 may receive the clustered LiDAR points from the clustering unit 130 through an input terminal IN1, may determine the first to $M^{th}$ shapes of first to $M^{th}$ layers related to a target object using the LiDAR points, and may output the determined shapes of the first to $M^{th}$ layers to the target shape determination unit 144 (step 210). Here, "M" is a positive integer of 1 or more. For example, "M" may be 6.

After step 210, the target shape determination unit 144 may determine the shape of the target object by analyzing the first to $M^{th}$ shapes according to a predetermined priority and may output the determined shape of the target object through the output terminal OUT1 (step 220).

Hereinafter, embodiments of the object shape analysis method 200 shown in FIG. 2, the layer shape determination unit 142 shown in FIG. 3, and the target shape determination unit 144 shown in FIG. 3 are described with reference to the accompanying drawings.

Figure 4:
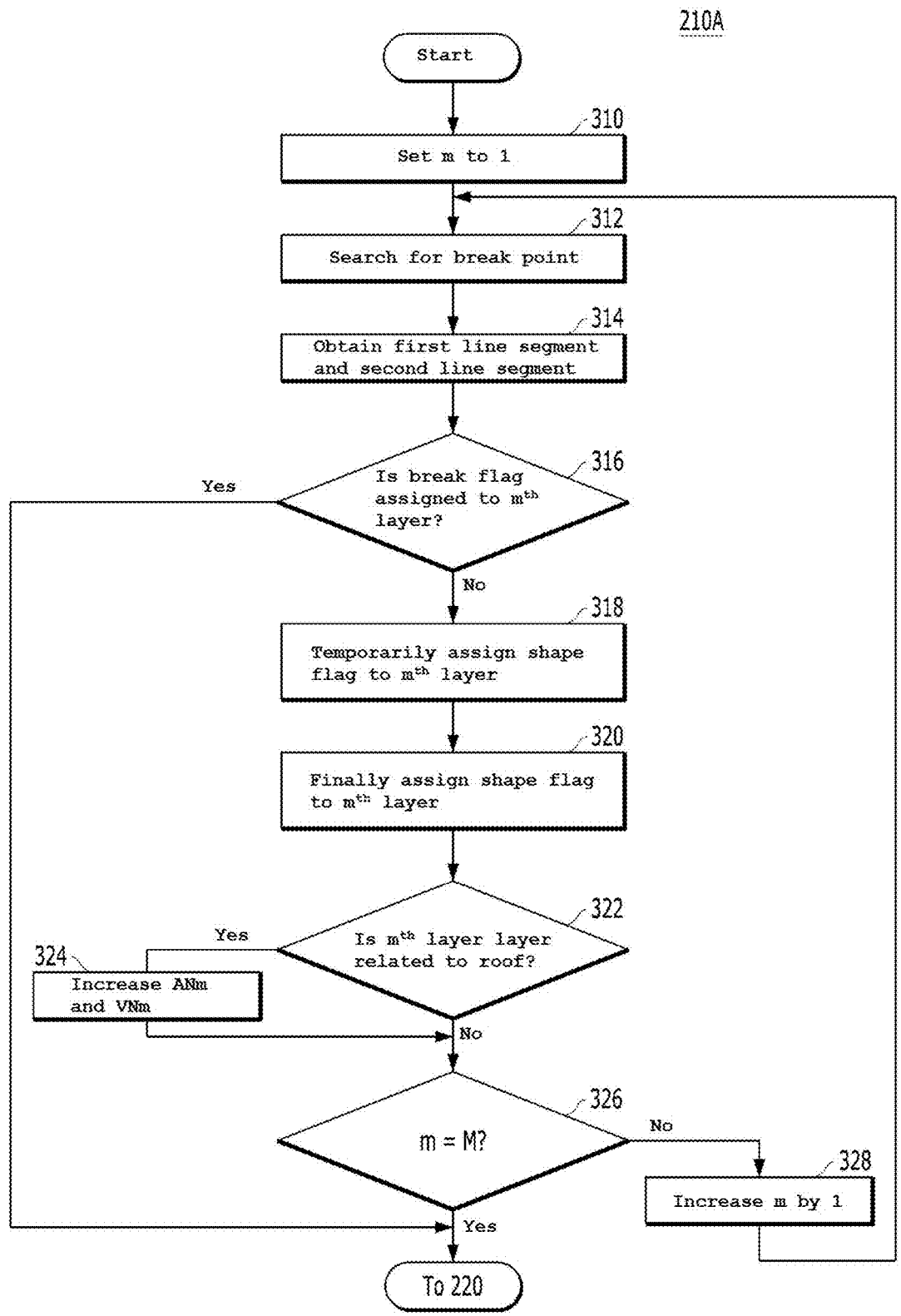
FIG. 4 is a flowchart of an embodiment of step 210 shown in FIG. 2.

FIG. 4 is a flowchart of an embodiment 210A of step 210 shown in FIG. 2.

The layer shape determination unit 142 shown in FIG. 3 may perform the method 210A shown in FIG. 4. To this end, the layer shape determination unit 142 may include a determination preparation unit 152 and a flag assignment unit 156. In addition, the layer shape determination unit 142 may further include an object analysis unit 154. In addition, the layer shape determination unit 142 may further include a roof layer inspection unit 158.

The shape of each of the M layers, i.e. the first to $M^{th}$ layers, related to one target object may be determined as follows.

First, "m" is set to 1 (step 310). Here, 1≤m≤M.

After step 310, among the LiDAR points included in the $m^{th}$ layer, the break point that is located farthest from the line segment (or baseline) connecting the first end point and the second end point is searched for (step 312).

Figure 5:
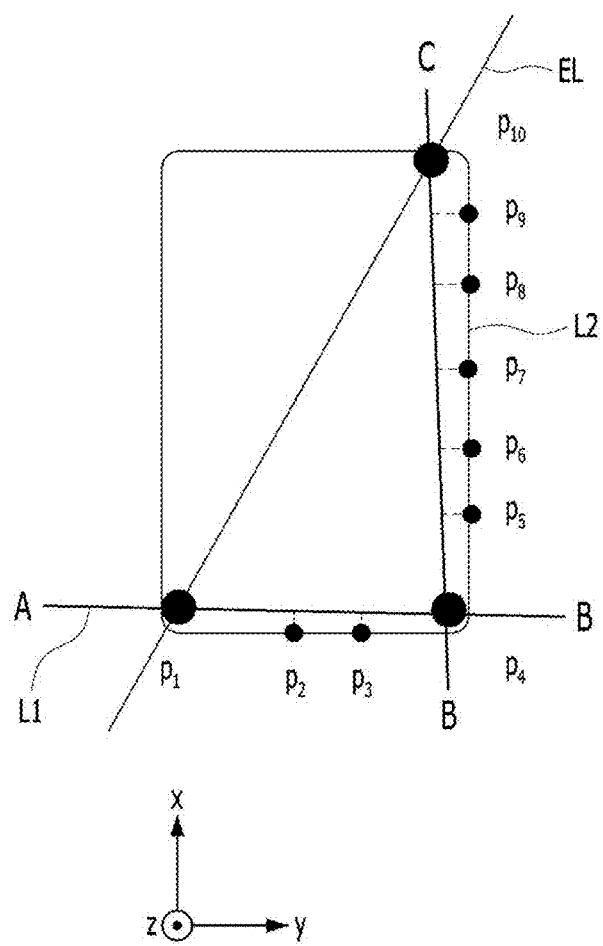
FIG. 5 is a diagram exemplarily showing LiDAR points included in the $m^{th}$ layer.

FIG. 5 is a diagram exemplarily showing the LiDAR points included in the $m^{th}$ layer.

To better understand the disclosure, step 210A shown in FIG. 4 is described with reference to FIG. 5 but is not limited thereto.

The LiDAR points related to one target object may be divided into M layers, i.e. the first to $M^{th}$ layers, in a vertical direction (e.g. the z-axis direction).

After step 310, among the LiDAR points included in the $M^{th}$ layer (e.g. p1 to p10 shown in FIG. 5), the break point B (p4) that is located farthest from the line segment EL connecting the first end point A (p1) and the second end point C (p10) is searched for (step 312).

Thereafter, a first line segment L1 connecting the first end point p1 and the break point p4 and a second line segment L2 connecting the second end point p10 and the break point p4 are generated (step 314).

Steps 310 to 314 described above may be performed by the determination preparation unit 152 shown in FIG. 3.

After step 314, the object analysis unit 154 may analyze the distribution pattern of the first and second LiDAR points in the $m^{th}$ layer and may determine whether to assign a break flag to the $m^{th}$ layer as a shape flag using the result of the analysis (step 316).

Here, the first LiDAR points may be LiDAR points (e.g. p2 and p3) located near the first line segment L1, among the LiDAR points (e.g. p1 to p10 shown in FIG. 5). The second LiDAR points may be LiDAR points (e.g. p5 to p9 shown in FIG. 5) located near the second line segment L2, among the LiDAR points (e.g. p1 to p10 shown in FIG. 5).

The break flag may be a flag indicating that the possibility that the target object displayed through the LiDAR points included in the $m^{th}$ layer is a dynamic object is low. In other words, when the degree to which the LiDAR points are dispersed in the $m^{th}$ layer is large, there is a possibility that the target object is a static object rather than a dynamic object. Therefore, it is possible to check whether the target object is a dynamic object or a static object using the variance of the LiDAR points.

Figure 6:
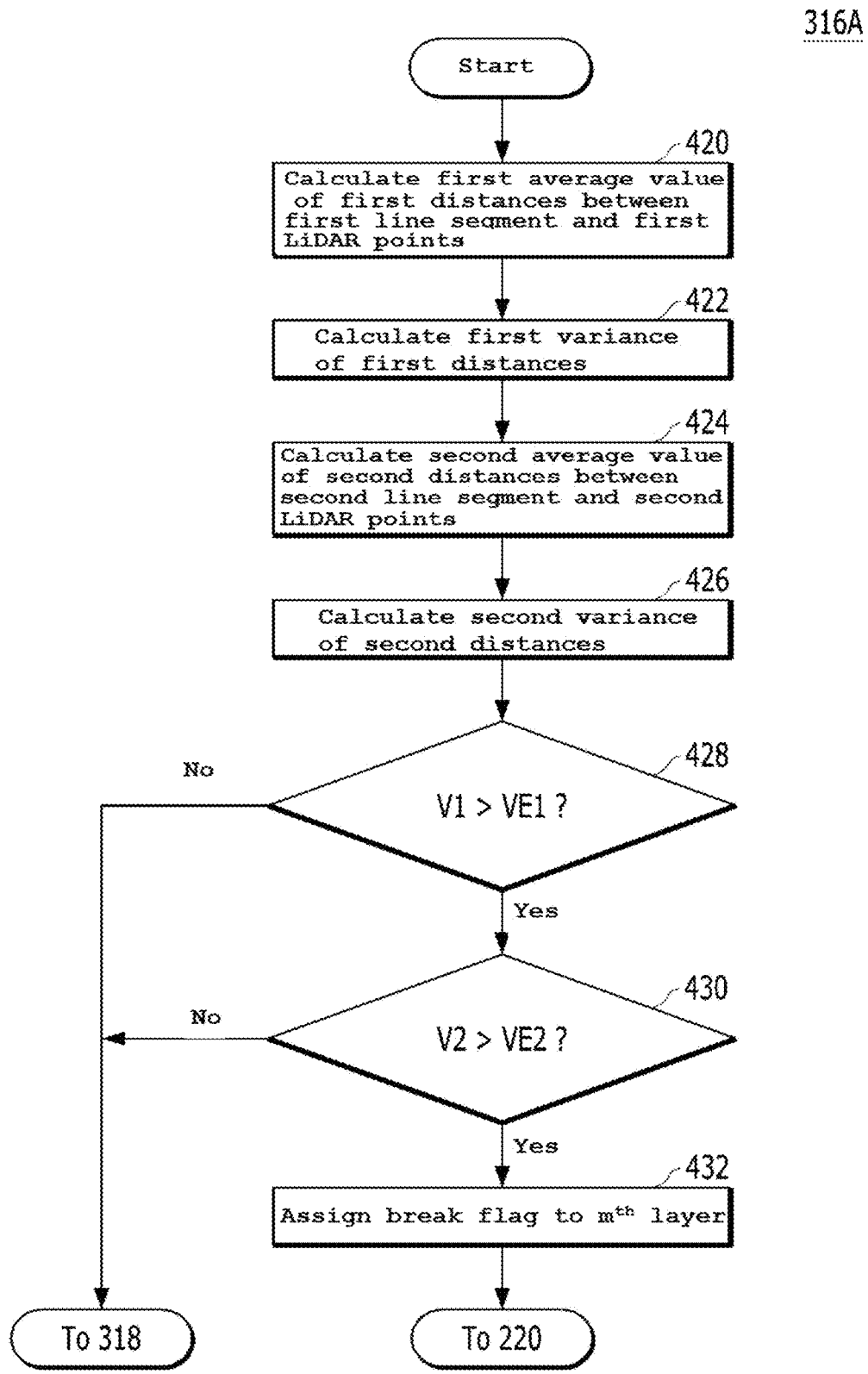
FIG. 6 is a flowchart of an embodiment of step 316 shown in FIG. 4.

FIG. 6 is a flowchart of an embodiment 316A of step 316 shown in FIG. 4.

The object analysis unit 154 may perform step 316A shown in FIG. 6. To this end, the object analysis unit 154 may include, for example, a first variance calculation unit 162, a second variance calculation unit 164, and a variance comparison unit 166.

For example, referring to FIGS. 3 and 6, after step 314, the first variance calculation unit 162 calculates a first average value A1 of the first distances between the first line segment L1 and the first LiDAR points, as expressed using Equation 1 below (step 420).

$$A1 = \frac{1}{n}\sum_{i=1}^{n} xi \qquad \text{[Equation 1]}$$

Here, "n" represents the total number of first LiDAR points included in the $m^{th}$ layer and "xi" represents the first distances. Referring to FIG. 5, "xi" corresponds to the spacing distances between the respective first LiDAR points p2 and p3 and the first line segment L1 in the x-axis direction.

After step 420, the first variance calculation unit 162 calculates a first variance V1 of the first distances xi using the first average value A1 of the first distances xi, as expressed using Equation 2 below and outputs the calculated first variance V1 to the variance comparison unit 166 (step 422).

$$V1 = \frac{1}{n}\sum_{i=1}^{n}(xi - A1)^2 \qquad \text{[Equation 2]}$$

After step 422, the second variance calculation unit 164 calculates a second average value A2 of the second distances yi between the second line segment L2 and the second LiDAR points, as expressed using Equation 3 below (step 424).

$$A2 = \frac{1}{q}\sum_{i=1}^{q} yi \qquad \text{[Equation 3]}$$

Here, "q" represents the total number of second LiDAR points included in the $m^{th}$ layer and "yi" represents the second distances. Referring to FIG. 5, "yi" corresponds to the spacing distances between the respective second LiDAR points p5 to p9 and the second line segment L2 in the y-axis direction.

After step 424, the second variance calculation unit 164 calculates a second variance V2 of the second distances yi using the second average value A2 of the second distances yi, as expressed using Equation 4 below, and outputs the calculated second variance V2 to the variance comparison unit 166 (step 426).

$$V2 = \frac{1}{q}\sum_{i=1}^{q}(yi - A2)^2 \qquad \text{[Equation 4]}$$

After step 426, the variance comparison unit 166 determines whether the first variance V1 is greater than a first variance threshold value VE1 (step 428). If the first variance V1 is greater than the first variance threshold value VE1, the variance comparison unit 166 determines whether the second variance V2 is greater than a second variance threshold value VE2 (step 430). Upon determining that the second variance V2 is greater than the second variance threshold value VE2, the variance comparison unit 166 may assign the break flag to the $m^{th}$ layer, and the process may go to step 220 (step 432). According to the embodiment, the first and second variance threshold values VE1 and VE2 may be the same as or different from each other. Further, each of the first and second variance threshold values VE1 and VE2 may be set in advance for each layer and stored or may be set in advance to a constant value regardless of the layers. For example, each of VE1 and VE2 may be 1.5.

However, when the first variance V1 is not greater than the first variance threshold value VE1 or when the second variance V2 is not greater than the second variance threshold value VE2, the possibility that the $m^{th}$ layer is a dynamic object rather than a static object is higher, and thus the process goes to step 318. For example, the static object may be an object that does not move, such as a traffic light, a tree, a traffic sign, or a guardrail, and the dynamic object may be an object that is moving, such as a vehicle.

As described above, the variance comparison unit 166 compares the first variance V1 and the second variance V2 with the first variance threshold value VE1 and the second variance threshold value VE2 respectively and assigns a break flag to the $m^{th}$ layer in response to the result of the comparison.

Alternatively, step 316 may be omitted from the object shape analysis method 200 using a LiDAR sensor according to the embodiment.

Meanwhile, when the break flag is not assigned to the $m^{th}$ layer, the flag assignment unit 156 may assign a shape flag to the $m^{th}$ layer using at least one of the first line segment, the second line segment, the first LiDAR points, or the second LiDAR points (steps 318 and 320).

To this end, as shown in FIG. 3, the flag assignment unit 156 may include a temporary flag assignment unit 170 and a final flag assignment unit 180.

The temporary flag assignment unit 170 temporarily assigns an L-shaped flag or an I-shaped flag to the $m^{th}$ layer as a shape flag in consideration of the size of the shape box of the $m^{th}$ layer including the first and second line segments L1 and L2 in response to the result of the comparison by the variance comparison unit 166. The shape box is described below in detail with reference to FIG. 14. In other words, upon recognizing that the break flag has not been assigned to the $m^{th}$ layer because the first variance V1 is not greater than the first variance threshold value VE1 and/or because the second variance V2 is not greater than the second variance threshold value VE2 as a result of the comparison by the variance comparison unit 166, the temporary flag assignment unit 170 may temporarily assign an L-shaped flag or an I-shaped flag to the $m^{th}$ layer as a shape flag in consideration of the size of the shape box of the $m^{th}$ layer including the first and second line segments (step 318).

Figure 7:
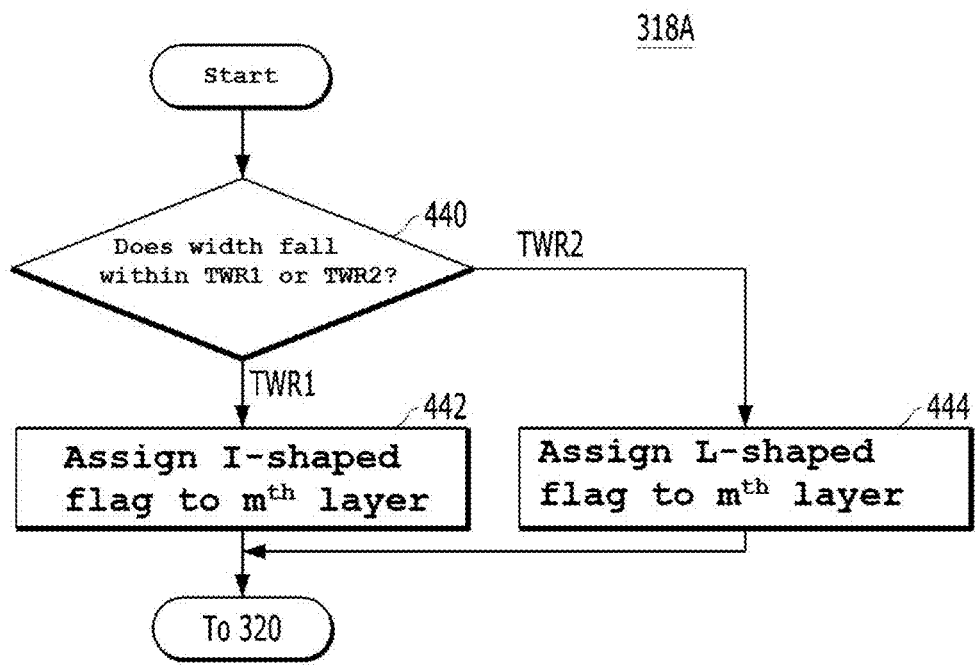
FIG. 7 is a flowchart of an embodiment of step 318 shown in FIG. 4.
Figure 8A:
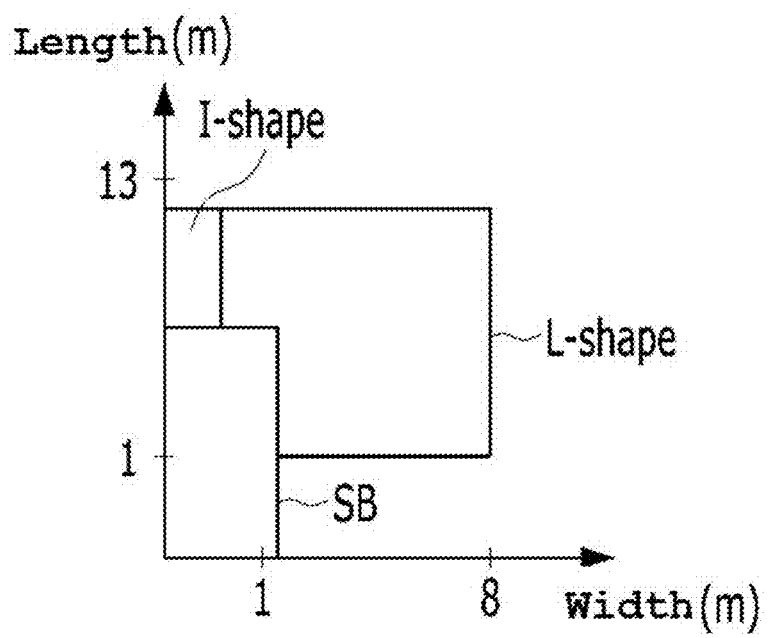
FIGS. 8(a) and 8(b) are diagrams to assist in understanding step 318A shown in FIG. 7.
Figure 8B:
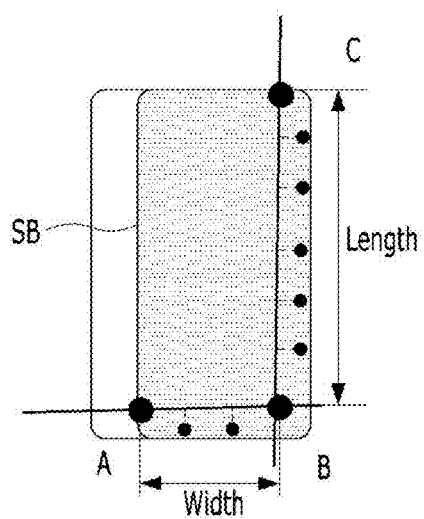

FIG. 7 is a flowchart of an embodiment 318A of step 318 shown in FIG. 4. FIGS. 8(a) and 8(b) are diagrams to assist in understanding step 318A shown in FIG. 7.

For example, the temporary flag assignment unit 170 may temporarily assign an L-shaped flag or an I-shaped flag to the $m^{th}$ layer using at least one of the length or the width of the shape box (e.g. SB shown in FIG. 8(b)) of the $m^{th}$ layer.

In other words, when it is recognized that the break flag has not been assigned to the $m^{th}$ layer, whether the width of the shape box of the $m^{th}$ layer falls within a first threshold width range TWR1 or a second threshold width range TWR2 may be determined (step 440).

If the width of the shape box of the $m^{th}$ layer falls within the first threshold width range TWR1, the I-shaped flag is temporarily assigned to the $m^{th}$ layer (step 442). However, if the width of the shape box falls within the second threshold width range, the L-shaped flag is temporarily assigned to the $m^{th}$ layer (step 444).

When the first threshold width range TWR1 has a range of the first minimum value MIN1 to the first maximum value MAX1 and the second threshold width range TWR2 has a range of the second minimum value MIN2 to the second maximum value MAX2, the second minimum value MIN2 may be greater than or equal to the first maximum value MAX1. For example, the first threshold width range TWR1 may be 0 m to 1 m, and the second threshold width range TWR2 may be 1 m to 8 m. In this way, the shape flag may be assigned to the $m^{th}$ layer using the width of the shape box SB, but the embodiment is not limited thereto. In other words, according to another embodiment, the shape flag may be temporarily assigned to the $m^{th}$ layer using at least one of the width or the length of the shape box SB.

The apparatus 100 according to the embodiment may track an object having a length of 13 m or less. When the length of the shape box SB shown in FIG. 8(b) falls within the range of 1 m to 13 m, if the width of the shape box SB falls within the first threshold width range TWR1 of 0 m to 1 m, the I-shaped flag may be temporarily assigned to the $m^{th}$ layer. If the width of the shape box SB falls within the range of 1 m to 8 m, the L-shaped flag may be temporarily assigned to the $m^{th}$ layer.

In order to perform the method shown in FIG. 7, as shown in FIG. 3, the temporary flag assignment unit 170 may include first and second width comparison units 172 and 174.

In conclusion, the temporary flag assignment unit 170 may temporarily assign the L-shaped flag or the I-shaped flag to the $m^{th}$ layer using at least one of the length or the width of the shape box SB (step 318A).

The first width comparison unit 172 may compare the width of the shape box SB with the first threshold width range TWR1 and may temporarily assign the I-shaped flag to the $m^{th}$ layer in response to the result of the comparison. In addition, the second width comparison unit 174 may compare the width of the shape box SB with the second threshold width range TWR2 and may temporarily assign the L-shaped flag to the $m^{th}$ layer in response to the result of the comparison.

After step 318, the final flag assignment unit 180 may determine whether to finally assign the L-shaped flag or the I-shaped flag, which has been temporarily assigned to the $m^{th}$ layer, to the $m^{th}$ layer using at least one of the first line segment L1, the second line segment L2, the first LiDAR points, or the second LiDAR points (step 320).

Figure 9:
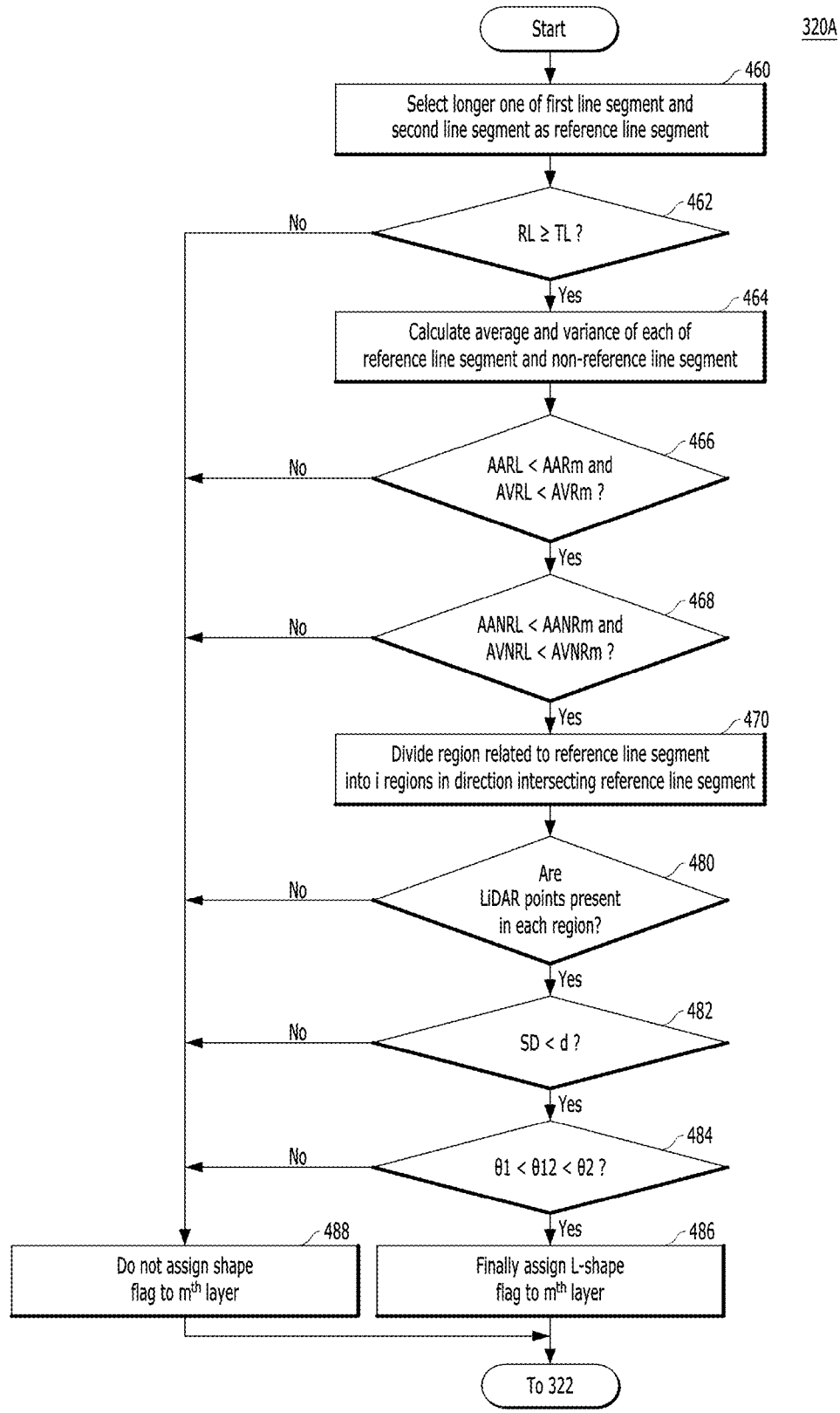
FIG. 9 is a flowchart of an embodiment of step 320 shown in FIG. 4.
Figure 10:
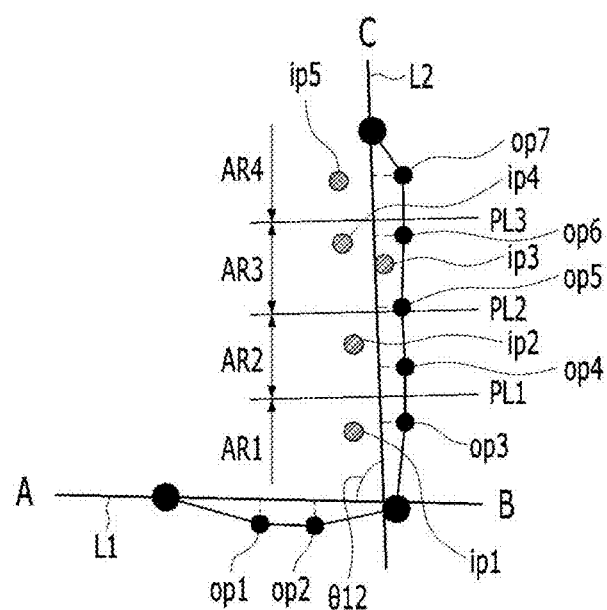
FIG. 10 is a diagram to assist in understanding the embodiment shown in FIG. 9.

FIG. 9 is a flowchart of an embodiment 320A of step 320 shown in FIG. 4 and FIG. 10 is a diagram for helping understand the embodiment 320A shown in FIG. 9. In FIG. 10, it is assumed that the first and second line segments L1 and L2 correspond to the first and second line segments L1 and L2 obtained in step 314, respectively.

Figure 11:
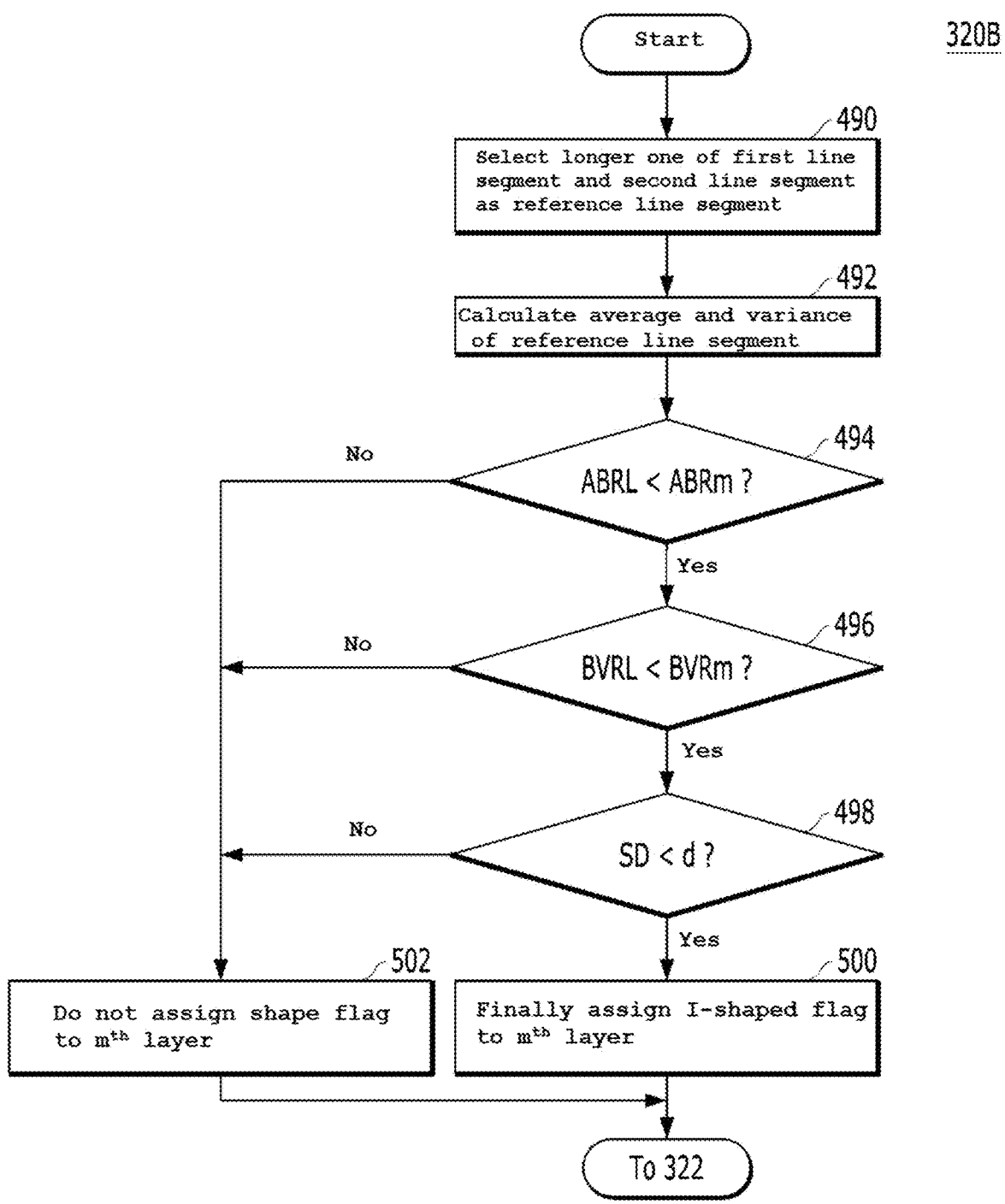
FIG. 11 is a flowchart of another embodiment of step 320 shown in FIG. 4.
Figure 12:
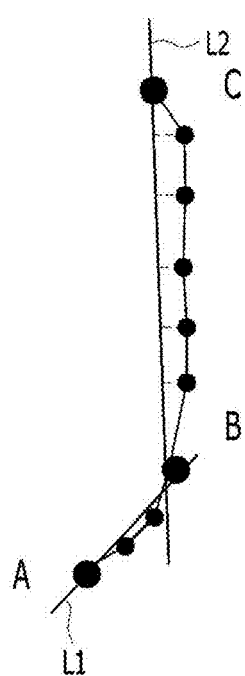
FIG. 12 is a diagram to assist in understanding the embodiment shown in FIG. 11.

FIG. 11 is a flowchart of another embodiment 320B of step 320 shown in FIG. 4 and FIG. 12 is a diagram for helping understand the embodiment 320B shown in FIG. 11.

When the L-shaped flag was temporarily assigned to the $m^{th}$ layer in step 318, the shape flag may be finally assigned to the $m^{th}$ layer through the method 320A shown in FIG. 9 (step 320A). However, when the I-shaped flag was temporarily assigned to the $m^{th}$ layer in step 318, the shape flag may be finally assigned to the $m^{th}$ layer through the method 320B shown in FIG. 11 (step 320B).

In order to perform the embodiments 320A and 320B shown in FIGS. 9 and 11, the final flag assignment unit 180 may include, for example, a reference line segment selection unit 182, a first flag assignment analysis unit 184, and a second flag assignment analysis unit 186, as shown in FIG. 3.

Upon recognizing that the L-shaped flag has been assigned to the $m^{th}$ layer based on the result of the comparison by the first width comparison unit 172, the first flag assignment analysis unit 184 may perform steps 462 to 488 shown in FIG. 9. However, step 462 shown in FIG. 9 may be performed by the reference line segment selection unit 182, rather than the first flag assignment analysis unit 184.

After step 318, the reference line segment selection unit 182 selects the longer line segment from among the first line segment L1 and the second line segment L2, provided from the determination preparation unit 152, as a reference line segment. The reference line segment selection unit 182 selects the shorter line segment from among the first line segment L1 and the second line segment L2 as a non-reference line segment (step 460). For example, referring to FIG. 10, since the second line segment L2 is longer than the first line segment L1, the first line segment L1 may be selected as a non-reference line segment and the second line segment L2 may be selected as a reference line segment.

After step 460, whether the length RL of the reference line segment (e.g. L2) is greater than or equal to a threshold length TL is checked (step 462). Here, the threshold length may be set differently for each of the M layers or may be set identically.

If the length RL of the reference line segment is neither greater than nor equal to the threshold length TL, the shape flag is not assigned to the $m^{th}$ layer (step 488). However, when the length RL of the reference line segment is greater than or equal to the threshold length TL, the average and the variance of each of the reference line segment and the non-reference line segment are calculated (step 464). Here, the average of the reference line segment means an average of the distances between the reference line segment and the LiDAR points located near the reference line segment. The variance of the reference line segment means a variance of the distances between the reference line segment and the LiDAR points located near the reference line segment. The average of the non-reference line segment means an average of the distances between the non-reference line segment and the LiDAR points located near the non-reference line segment. The variance of the non-reference line segment means a variance of the distances between the non-reference line segment and the LiDAR points located near the non-reference line segment.

After step 464, whether the average AARL and the variance AVRL of the reference line segment are less than a reference threshold average AARm and a reference threshold variance AVRm respectively is checked (step 466). Here, each of the reference threshold average AARm and the reference threshold variance AVRm may be set in advance for each set of coordinates of the $m^{th}$ layer and stored or may be set in advance to a constant value regardless of the coordinates of the $m^{th}$ layer and stored.

If the average AARL of the reference line segment is not less than the reference threshold average AARm, or if the variance AVRL of the reference line segment is not less than the reference threshold variance AVRm, the shape flag is not assigned to the $m^{th}$ layer (step 488).

However, if the average AARL of the reference line segment is less than the reference threshold average AARm and the variance AVRL of the reference line segment is less than the reference threshold variance AVRm, whether the average AANRL and variance AVNRL of the non-reference line segment are less than a non-reference threshold average AANRm and a non-reference threshold variance AVNRm respectively is checked (step 468). Here, each of the non-reference threshold average AANRm and the non-reference threshold variance AVNRm may be set in advance for each set of coordinates of the $m^{th}$ layer and stored or may be set in advance to a constant value regardless of the coordinates of the $m^{th}$ layer and stored.

If the average AANRL of the non-reference line segment is not less than the non-reference threshold average AANRm or if the variance AVNRL of the non-reference line segment is not less than the non-reference threshold variance AVNRm, the shape flag is not assigned to the $m^{th}$ layer (step 488).

However, when the average AANRL of the non-reference line segment is less than the non-reference threshold average AANRm and the variance AVNRL of the non-reference line segment is less than the non-reference threshold variance AVNRm, the region related to the reference line segment is divided into i regions in the direction intersecting the reference line segment (step 470). Here, "i" is a positive integer of 1 or more. For example, "i" may be 4. For example, referring to FIG. 10, it can be seen that the region related to the reference line segment L2 is divided into four (i=4) regions AR1 to AR4 in the direction perpendicular to the reference line segment L2. In order to divide the region, three (i−1=3) straight lines may be arranged so as to be oriented in the direction perpendicular to the reference line segment L2.

After step 470, whether a LiDAR point is present in each of the i regions resulting from the division is checked (step 480). For example, in FIG. 10, LiDAR points ip1 to ip5 located on the left of the second line segment L2 are referred to as "inner LiDAR points" and the LiDAR points op3 to op7 located on the right of the second line segment L2 are referred to as "outer LiDAR points". In this case, after step 470, whether the inner or outer LiDAR points are present in each of the four regions AR1 to AR4 resulting from the division is checked (step 480). If no LiDAR point is present in even one of the four regions resulting from the division, the shape flag is not assigned to the $m^{th}$ layer (step 488).

However, when the LiDAR point is present in each of the regions resulting from the division, whether the spacing distance SD between neighboring outer LiDAR points located in the regions resulting from the division is less than a threshold spacing distance d is checked (step 482). Here, the threshold spacing distance d may be set in advance. In FIG. 10, the line connecting neighboring outer LiDAR points may be a segment. For example, each of the line connecting the outer points op1 and op2, the line connecting the outer points op3 and op4, the line connecting the outer points op4 and op5, the line connecting the outer points op5 and op6, and the line connecting the outer points op6 and op7 may be a segment. In step 482, whether the length SD of the segment is less than the threshold spacing distance d is determined. If the length SD of the segment is not less than the threshold spacing distance d, the shape flag is not assigned to the $m^{th}$ layer (step 488).

However, when the length SD of the segment is less than the threshold spacing distance d, whether the angle θ12 between the first line segment L1 and the second line segment L2 is greater than a first angle θ1 and less than a second angle θ2 is determined (step 484). Here, the first angle θ1 and the second angle θ2 may be set in advance for each layer or may be set in advance to a constant value regardless of the layers. If the angle θ12 between the first line segment L1 and the second line segment L2 is less than the first angle θ1 or greater than the second angle θ2, the shape flag is not assigned to the $m^{th}$ layer (step 488).

However, if the angle θ12 between the first line segment L1 and the second line segment L2 is greater than the first angle θ1 and less than the second angle θ2, the L-shaped flag is finally assigned to the $m^{th}$ layer (step 486).

Upon recognizing that the I-shaped flag has been assigned to the $m^{th}$ layer based on the result of the comparison by the second width comparison unit 174, the second flag assignment analysis unit 186 may perform steps 492 to 502 shown in FIG. 11.

First, referring to FIG. 11, the longer line segment between the first line segment L1 and the second line segment L2 is selected as the reference line segment (step 490). Since step 490 is the same as step 460, a description thereof has been omitted.

After step 490, whether the average ABRL and the variance BVRL of the reference line segment (L2 shown in FIG. 12) are less than a reference threshold average ABRm and a reference threshold variance BVRm respectively is determined (steps 494 and 496). Here, the reference threshold average ABRm and the reference threshold variance BVRm may be the same as the reference threshold average AARm and the reference threshold variance AVRm shown in FIG. 9 respectively. The reference threshold average ABRm and the reference threshold variance BVRm may be set in advance for each of the M layers and stored or may be set in advance to a constant value regardless of the layers and stored.

If the average ABRL is not less than the reference threshold average ABRm or if the variance BVRL is not less than the reference threshold variance BVRm, the shape flag is not assigned to the $m^{th}$ layer (step 502). However, if the average ABRL is less than the reference threshold average ABRm and the variance BVRL is less than the reference threshold variance BVRm, whether the spacing distance SD between the outer LiDAR points located in j regions resulting from the division in the direction intersecting the reference line segment is less than the threshold spacing distance d is determined (step 498). Here, "j" is a positive integer of 1 or more. "j" may be the same as or different from "i". Since step 498 is the same as step 482, a duplicate description thereof has been omitted.

If the spacing distance SD is not less than the threshold spacing distance d, the shape flag is not assigned to the $m^{th}$ layer (step 502). However, if the spacing distance SD is less than the threshold spacing distance d, the I-shaped flag is finally assigned to the $m^{th}$ layer (step 500).

Meanwhile, referring again to FIG. 4, step 210A may further include step 322, which is performed after step 320. In other words, the layer shape determination unit 142 shown in FIG. 3 may further include a roof layer inspection unit 158, which performs step 322. In some embodiments, step 322 and the roof layer inspection unit 158 may be omitted.

After step 320, the roof layer inspection unit 158 may check whether the $m^{th}$ layer is a layer related to the roof of the target object (hereinafter referred to as a "roof layer") and may output the result of the checking to the first flag assignment analysis unit 184 and the determination preparation unit 152 (step 322). If the $m^{th}$ layer is the roof layer of the target object, the non-reference threshold average AANRm and the non-reference threshold variance AVNRm, which are used for the $m+1^{th}$ layer in step 320, i.e. step 468 shown in FIG. 9, may be increased (step 324). In this way, when the non-reference threshold average AANRm and the non-reference threshold variance AVNRm are increased, conditions to be considered in order to assign the L-shaped flag to the $m+1^{th}$ layer may be relaxed. The purpose of this is that, when the target object is a vehicle, the structural characteristic of the target vehicle in which the front bumper is rounder than the rear bumper is reflected in the determination as to whether to assign the L-shaped flag to the $m+1^{th}$ layer.

Step 324 may be performed by the first flag assignment analysis unit 184, the roof layer inspection unit 158, or the determination preparation unit 152.

Figure 13:
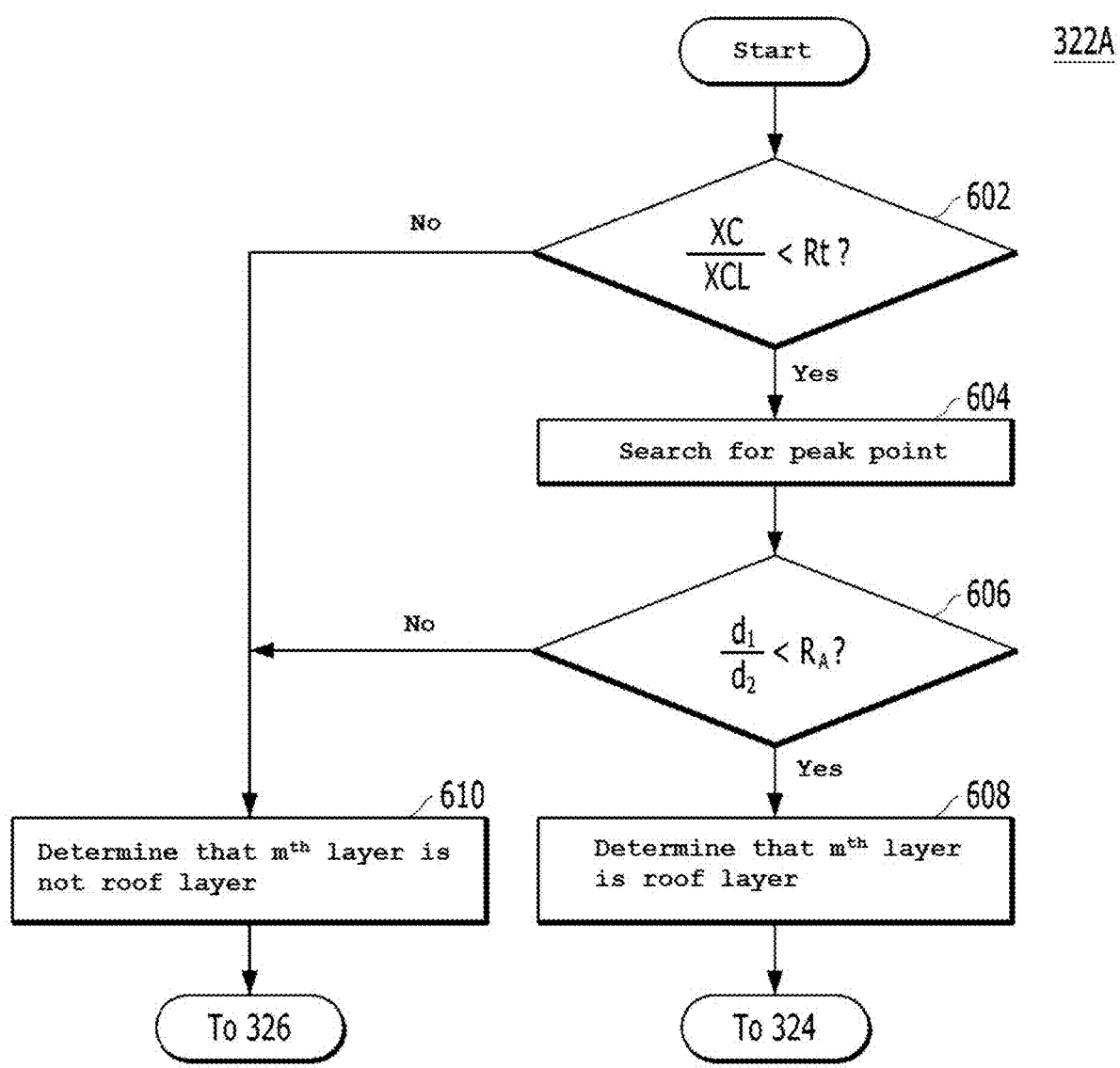
FIG. 13 is a flowchart of an embodiment of step 322 shown in FIG. 4.

FIG. 13 is a flowchart of an embodiment 322A of step 322 shown in FIG. 4, and FIGS. 14-16 are diagrams to assist in understanding step 322A shown in FIG. 13.

Figure 14:
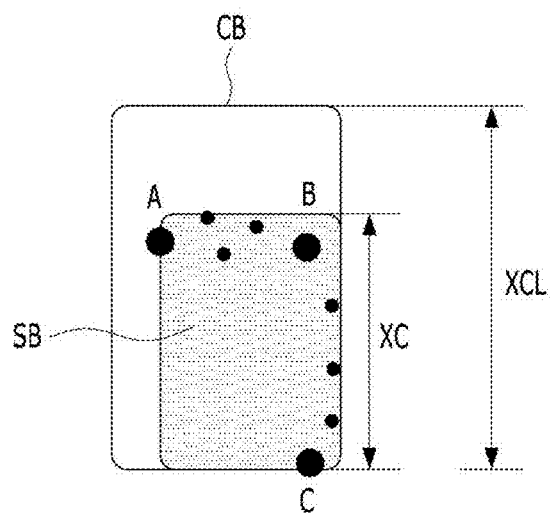
FIG. 14 is a diagram to assist in understanding step 602 shown in FIG. 13.

In FIG. 14, the clustering box CB may be a box including the LiDAR points related to the first to $M^{th}$ layers and the shape box SB may be a box including the LiDAR points related to the $m^{th}$ layer.

According to the embodiment, the roof layer inspection unit 158 may perform steps 602 to 610 shown in FIG. 13.

First, referring to FIG. 14, whether the first ratio R1 of the length XC of the shape box SB of the $m^{th}$ layer to the length XCL of the clustering box CB related to the target object is less than a first threshold ratio Rt is determined as in Equation 5 below (step 602).

$$\frac{XC}{XCL} < Rt \qquad \text{[Equation 5]}$$

Here, "XC/XCL" represents the first ratio R1. The first threshold ratio Rt may be set in advance for each of the M layers or may be set in advance to a constant value regardless of the M layers.

If the first ratio R1 is less than the first threshold ratio Rt, a peak point is searched for according to each shape flag finally assigned to the $m^{th}$ layer (step 604). For example, the roof layer inspection unit 158 may determine a LiDAR point located farthest from the shorter one of the first line segment and the second line segment to be a peak point or may determine the break point to be a peak point in response to the result of the comparison between the first ratio R1 and the first threshold ratio Rt and the result of the final assignment of the shape flag by the final flag assignment unit 184.

Figure 15A:
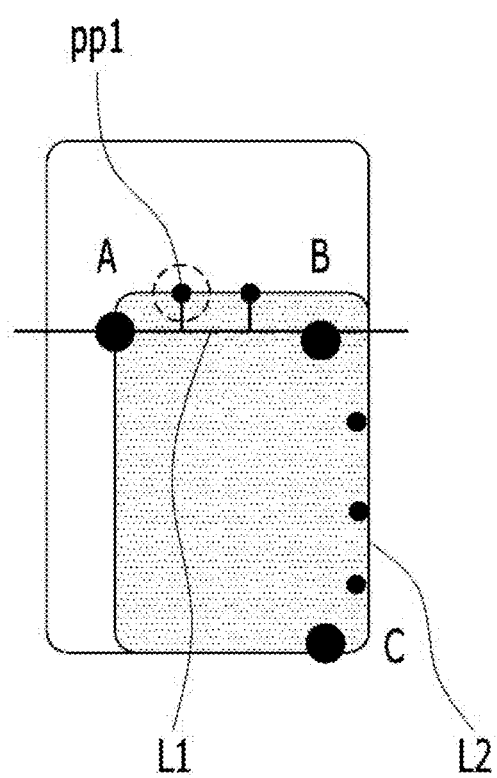
FIGS. 15(a) and 15(b) are diagrams to assist in understanding step 604 shown in FIG. 13.
Figure 15B:
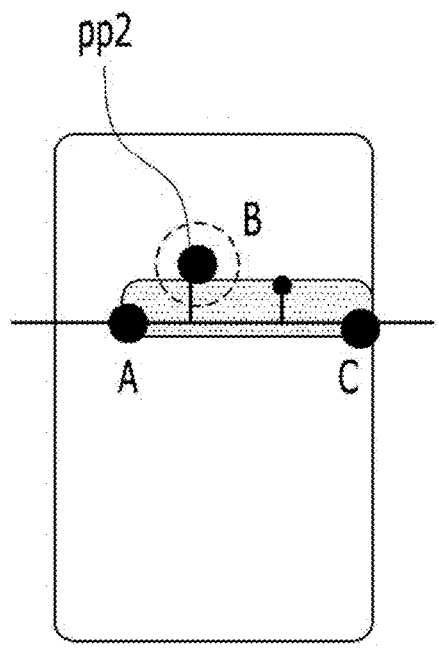

In detail, in the case in which the L-shaped flag is finally assigned to the m$^{th}$ layer, referring to FIG. 15(*a*), the LiDAR point pp1 located farthest from the shorter one (L1 in FIG. 15(*a*)) of the first line segment L1 and the second line segment L2 may be determined to be a peak point. Alternatively, in the case in which the I-shaped flag is finally assigned to the m$^{th}$ layer, as shown in FIG. 15(*b*), the break point (point located at region B) pp2 may be determined to be a peak point.

Figure 16:
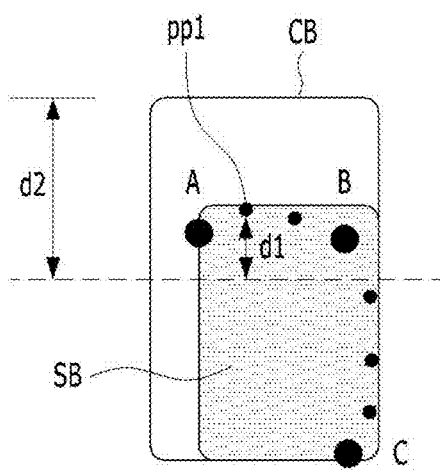
FIG. 16 is a diagram for helping understand step 606 shown in FIG. 13.

After step 604, whether the second ratio of the length from the peak point to the middle of the clustering box to half the length of the clustering box is less than a second threshold ratio may be checked (step 606). For example, when the L-shaped flag is finally assigned to the m$^{th}$ layer and the peak point is determined to be pp1 shown in FIG. 15(*a*), as shown in FIG. 16, whether the second ratio R2 of the length d1 from the peak point pp1 to the middle of the clustering box CB to half d2 the length of the clustering box CB is less than the second threshold ratio RA may be checked as in Equation 6 below.

$$\frac{d1}{d2} < R_A \quad \text{[Equation 6]}$$

Here, "d1/d2" represents the second ratio R2. The second threshold ratio RA may be set in advance for each of the M layers or may be set in advance to a constant value regardless of the M layers.

If the second ratio R2 is less than the second threshold ratio RA, it is determined that the m$^{th}$ layer is the roof layer of the target object (step 608). However, if the first ratio R1 is not less than the first threshold ratio Rt or if the second ratio R2 is not less than the second threshold ratio RA, it is determined that the m$^{th}$ layer is not the roof layer of the target object (step 610).

Referring again to FIG. 4, after it is determined that the m$^{th}$ layer is not the roof layer of the target object or after step 324, whether m is M is checked (step 326). If m is not M, m is increased by 1 and then the process goes to step 312 (step 328). Accordingly, steps 312 to 324 are performed on the m+1$^{th}$ layer. In other words, the shape flag may be assigned to the m+1$^{th}$ layer in the same method as the method of assigning the shape flag to the m$^{th}$ layer. For example, steps 326 and 328 may be performed by the determination preparation unit 152, but the embodiment is not limited thereto.

Figure 17:
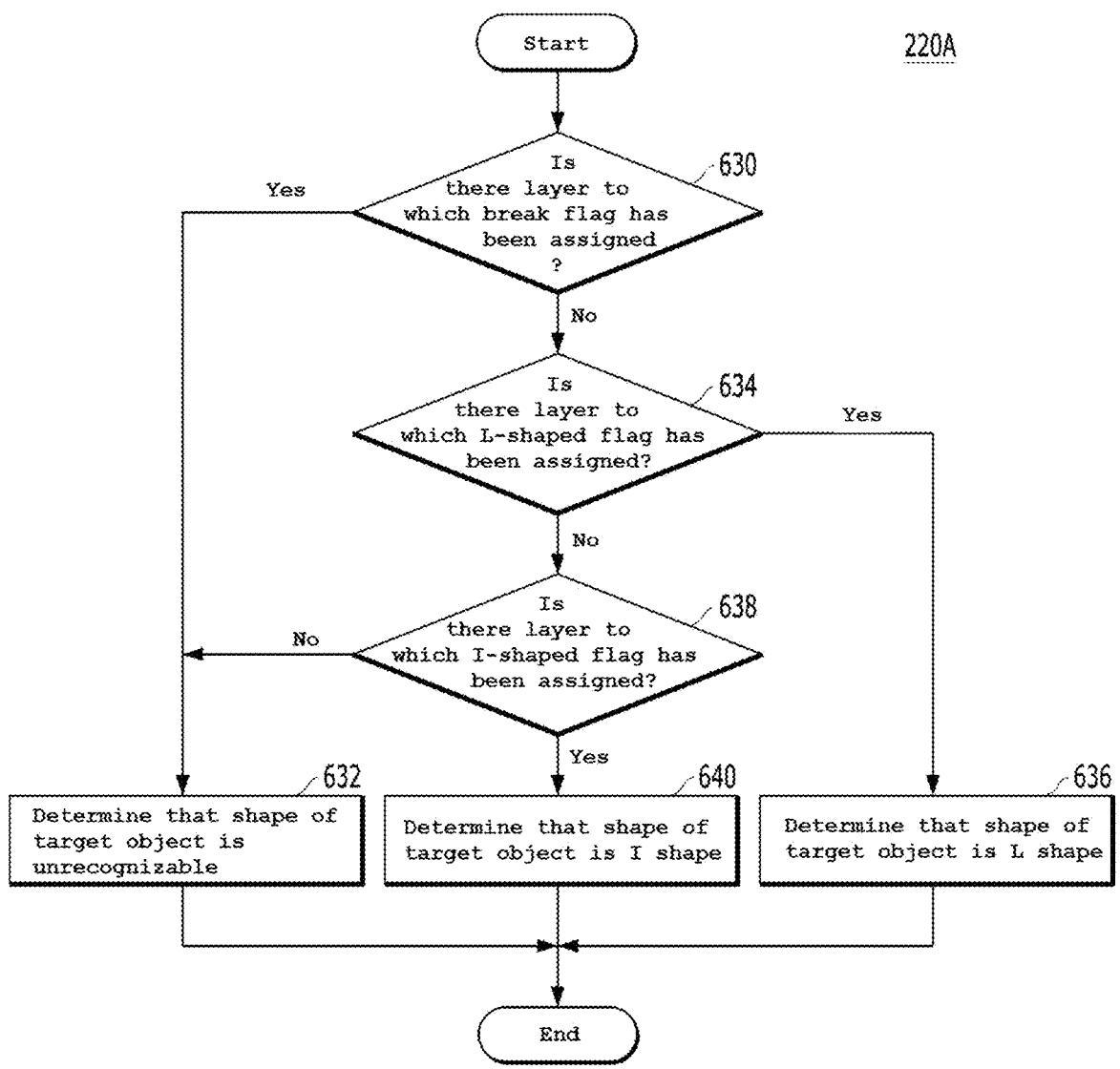
FIG. 17 is a flowchart of an embodiment of step 220 shown in FIG. 2.

FIG. 17 is a flowchart of an embodiment 220A of step 220 shown in FIG. 2.

In order to perform the embodiment 220A shown in FIG. 17, as shown in FIG. 3, the target shape determination unit 144 may include first to third flag inspection units 192, 194, and 196 and a final shape output unit 198.

The first flag inspection unit 192 checks whether there is a layer to which the break flag has been assigned, among the first to M$^{th}$ layers and outputs the result of the checking to the final shape output unit 198 (step 630). Upon recognizing that there is a layer to which the break flag has been assigned, among the first to M$^{th}$ layers, based on the result of the checking by the first flag inspection unit 192, the final shape output unit 198 determines that the shape of the target object is unrecognizable (or unknown) (step 632).

Upon recognizing that there is no layer to which the break flag has been assigned based on the result of the checking by the first flag inspection unit 192, the second flag inspection unit 194 checks whether there is a layer to which the L-shaped flag has been assigned and outputs the result of the checking to the final shape output unit 198 (step 634). Upon recognizing that there is no layer to which the break flag has been assigned but there is a layer to which the L-shaped flag has been assigned, among the first to M$^{th}$ layers, based on the results of the checking by the first flag inspection unit 192 and the second flag inspection unit 194, the final shape output unit 198 determines that the target object has an "L" shape (step 636).

Upon recognizing that there is no layer to which the L-shaped flag has been assigned based on the result of the checking by the second flag inspection unit 194, the third flag inspection unit 196 checks whether there is a layer to which the I-shaped flag has been assigned and outputs the result of the checking to the final shape output unit 198 (step 638). Upon recognizing that there is no layer to which any one of the break flag and the L-shaped flag has been assigned but there is a layer to which the I-shaped flag has been assigned, among the first to M$^{th}$ layers, based on the results of the checking by the first to third flag inspection units 192, 194 and 196, the final shape output unit 198 determines that the target object has an "I" shape (step 640).

As described above, when the final shape output unit 198 determines the shape of the target object, the break flag, the L-shaped flag, and the I-shaped flag are checked in that order.

However, upon recognizing that there is no layer to which any one of the break flag, the L-shaped flag, and the I-shaped flag has been assigned, among the first to M$^{th}$ layers, based on the results of the checking by the first to third flag inspection units 192, 194, and 196, the final shape output unit 198 determines that the shape of the target object is unrecognizable (step 632).

Figure 18:
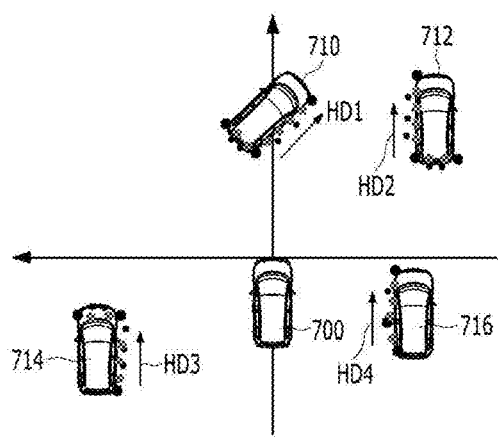
FIG. 18 shows various types of target vehicles on the basis of a host vehicle.

FIG. 18 shows various types of target vehicles 710 to 716 on the basis of the host vehicle 700.

Referring to FIG. 18, the target vehicle 716, only the side surface of which is scanned from the host vehicle 700, has an I-shaped contour (or, I-shaped outer contour), and the target vehicles 710, 712, and 714, the side surfaces and the bumpers of which are scanned from the host vehicle 700, have L-shaped contours (or, L-shaped outer contours). A dynamic object in a downtown area or an expressway mainly has an L-shaped contour or an I-shaped contour. Therefore, it is possible to temporarily determine in step 318 whether an object has an I-shaped contour or an L-shaped contour based on the size of the shape box SB having the form of a contour.

The contour (or, shape) of a target vehicle, which is a target object, may be determined by the object-tracking apparatus 100 and the object shape analysis method 200 using a LiDAR sensor according to the embodiments described above. For example, referring to FIG. 18, the target vehicles 710, 712 and 714 may be determined to have L-shaped contours and the target vehicle 716 may be determined to have an I-shaped contour. In this case, the object-tracking apparatus 100 according to the embodiment may recognize the heading directions of the target vehicles 710 to 716 using the determined contours of the target vehicles. For example, when the target vehicles 710 to 716 have L-shaped and I-shaped contours, the heading directions of the target vehicles 710 to 716 may be directions (e.g. HD1, HD2, HD3 and HD4 shown in FIG. 18) parallel to the longer one of the first line segment and the second line segment.

Hereinafter, a comparative example and an embodiment of the present disclosure are described with reference to the accompanying drawings.

Figure 19:
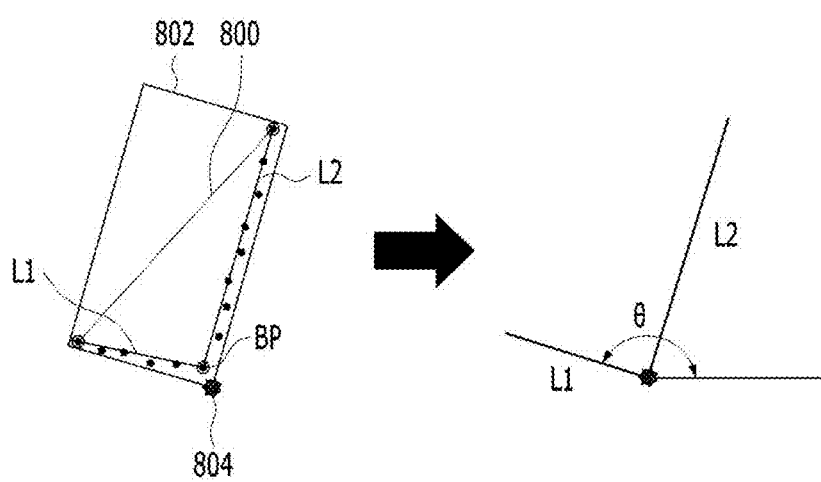
FIG. 19 is a diagram for explaining a shape analysis method and an object-tracking apparatus according to a comparative example.

FIG. 19 is a diagram for explaining a shape analysis method and an object-tracking apparatus according to a comparative example.

In the comparative example, the break point BP located farthest from a baseline 800 is searched for. Thereafter, the heading direction of an object is determined on the basis of the longer one of the first line segment L1 and the second line segment L2. Thereafter, among the four corner points of a bounding box 802, the corner point 804 located closest to the break point BP is determined to be a corner point having L-shape characteristics. Thereafter, an object is tracked (for example, the heading angle of an object is extracted) using the first line segment L1, the second line segment L2, the corner point 804, and the angle θ formed by the first line segment L1 and the second line segment L2. However, the comparative example, which analyzes the shape of an object in this way, has a limitation in the determination of the shape of a static object except for a dynamic object.

FIGS. 20(a)-20(e) are diagrams for explaining extraction of the heading angle of an object.

Figure 20A:
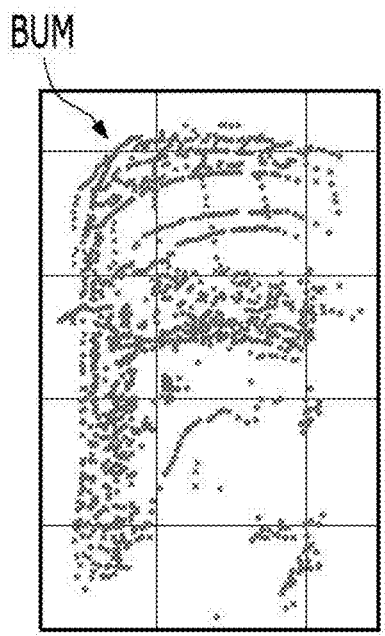
FIGS. 20(a)-20(e) are diagrams for explaining extraction of the heading angle of an object.
Figure 20B:
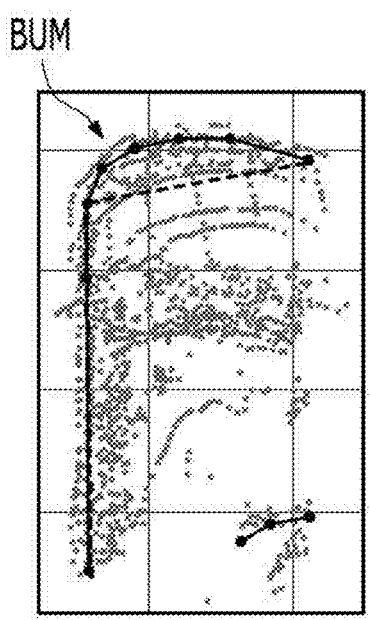
Figure 20C:
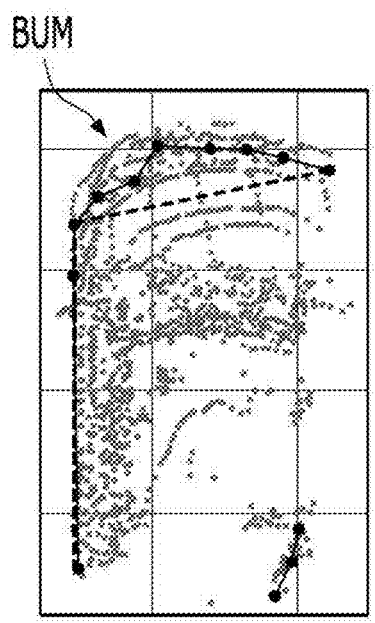
Figure 20D:
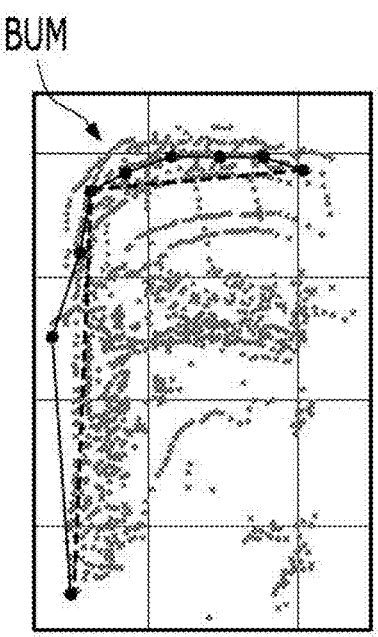
Figure 20E:
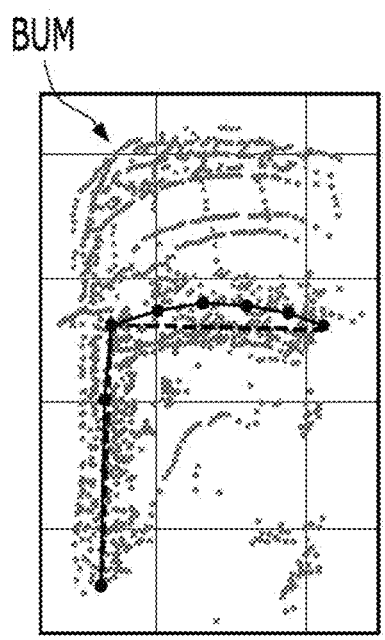

FIG. 20(a) is a two-dimensional projection of an object and FIGS. 20(b)-20(e) show a contour layer 0, a contour layer 1, a contour layer 2, and a contour layer 3 of an object respectively.

Figure 21:
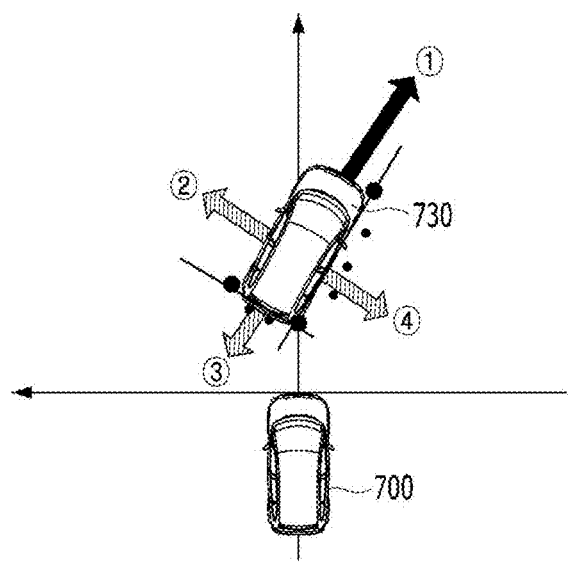
FIG. 21 is a diagram for explaining the heading direction of a target vehicle.

FIG. 21 is a diagram for explaining the heading direction of a target vehicle.

In the case in which the heading angle of a target vehicle is extracted as in the comparative example described above, as shown in FIG. 20, because the bumper BUM of the target vehicle has a curved shape rather than a rectangular shape, when the heading angle is extracted using only the angle formed by a peak point, the heading angle may be strongly dependent on the peak point so that the heading angle may be sensitive to the peak point and varied. In other words, in the comparative example, the heading direction of the target vehicle 730 may be wrongly extracted from among four directions ①, ②, ③ and ④ shown in FIG. 21.

In contrast, according to an embodiment of the present disclosure, the distribution of the LiDAR points (e.g. the inner LiDAR points and the outer LiDAR points described above) located near the first and second line segments L1 and L2 is numerically calculated, the shape flag is assigned to each of the M layers resulting from the division in the height direction (i.e. the z-axis direction) of the target vehicle, and the interconnected relationship between the layers is utilized. Accordingly, it is possible to effectively recognize the characteristics of a dynamic object and thus to accurately determine whether the target object has an L-shaped contour or an I-shaped contour or whether the shape of the target object is unrecognizable. As a result, it is also possible to accurately determine the heading direction of the target vehicle using the accurately determined shape of the target vehicle and to provide highly reliable information about the external appearance of the target vehicle (e.g. the width or the length of the target vehicle). Particularly, the embodiment may minimize an error in the determination of the heading direction of a dynamic object by assigning the shape flag to the dynamic object. The dynamic object is described below in more detail with reference to FIG. 23.

Figure 22A:
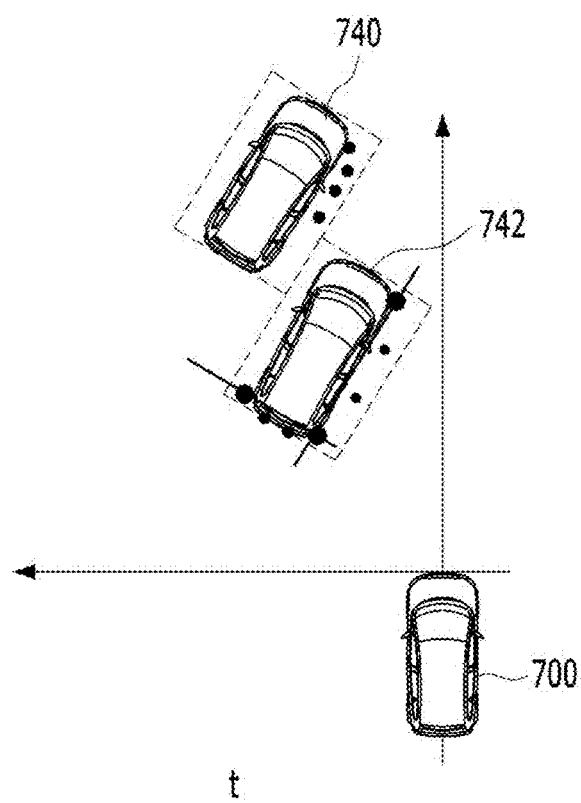
FIGS. 22(a) and 22(b) are diagrams for explaining association performed by the object-tracking apparatus.
Figure 22B:
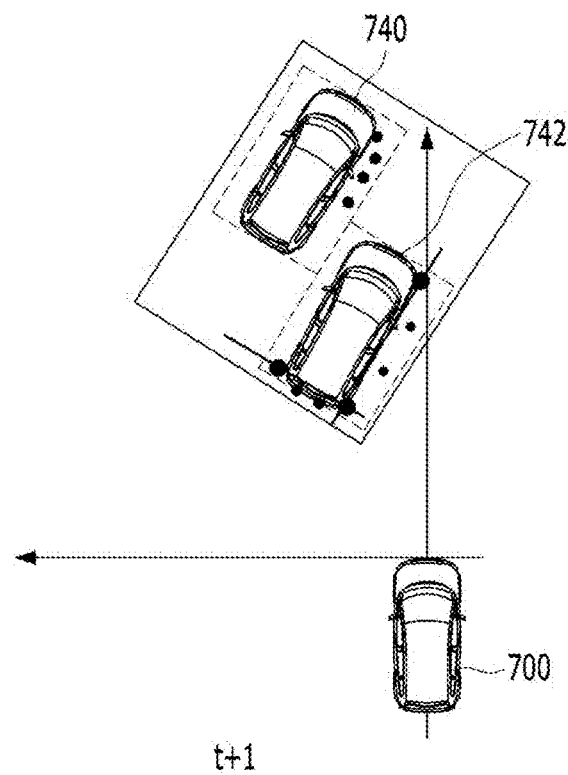

FIGS. 22(a) and 22(b) are diagrams for explaining the association performed by the object-tracking apparatus 100.

When two target objects 740 and 742, which are separated from each other in a first frame t as shown in FIG. 22(a), are clustered into one object in a second frame t+1 subsequent to the first frame t as shown in FIG. 22(b), since the comparative example does not provide a reference on which to distinguish the target objects 740 and 742, the two objects 740 and 742 may be combined. In contrast, according to the embodiment, since the shape frame (or the shape flag) is assigned to at least one of the two objects 740 and 742, even if the two objects 740 and 742 are combined in the second frame t+1, it is possible to individually output information about the two objects 740 and 742, as shown in FIG. 22(b).

Figure 23:
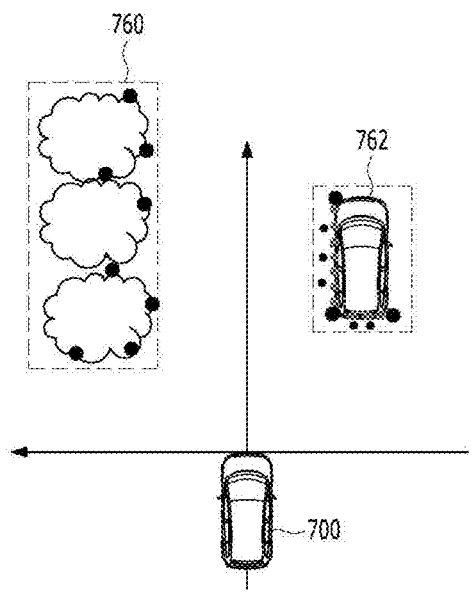
FIG. 23 is a diagram for explaining a dynamic object.

FIG. 23 is a diagram for explaining a dynamic object.

In the comparative example, it is not possible to determine whether the target object is a dynamic object (e.g. a vehicle) 762 or a static object (e.g. a flower bed) 760 using the distribution of LiDAR points. In contrast, according to the embodiment, in the process of analyzing the shape of a target object, it is possible to recognize the possibility that the target object is not a dynamic object by performing step 316 (or step 316A). Thus, this assists in the subsequent process of determining whether the object, the shape of which has been finally determined, is a dynamic object or a static object based on a score.

As is apparent from the above description, according to an object shape analysis method and an object-tracking apparatus using a LiDAR sensor according to the embodiments, it is possible to effectively recognize the characteristics of a dynamic object and thus to accurately determine whether the target object has an L-shaped contour or an I-shaped contour or whether the shape of the target object is unrecognizable. In addition, it is also possible to accurately determine the heading direction of a target vehicle using the accurately determined shape of the target vehicle. Thus, this minimizes an error in the determination of the heading direction of the target vehicle, provides highly reliable information about the external appearance of the target vehicle (e.g. the width or the length of the target vehicle), and assists in the subsequent process of determining whether the object, the shape of which has been finally determined, is a dynamic object or a static object based on a score. In addition, in case a shape flag is assigned to at least one of two objects, even if the two objects are combined later, it is possible to individually output information about the two objects.

However, the effects achievable through the disclosure are not limited to the above-mentioned effects and other effects not mentioned herein should be clearly understood by those having ordinary skill in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to specific embodiments thereof, these embodiments are only proposed for illustrative purposes and do not restrict the present disclosure. It should be apparent to those having ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of analyzing a shape of a target object using a LiDAR sensor, the method comprising:
   (a) acquiring a point cloud comprising a plurality of points related to the target object and clustering the point cloud to generate clustered LiDAR points;
   (b) determining shapes of all of first to $M^{th}$ layers (where M is a positive integer of 2 or more) related to the target object using the clustered LiDAR points;
   (c) analyzing the determined shapes according to a predetermined priority to determine a shape of the target object; and
   (d) tracking a heading direction of the target object by using the determined shape of the target object,
   wherein a shape of an $m^{th}$ layer (where $1 \leq m \leq M$) among the first to $M^{th}$ layers is determined in step (b), and
   wherein step (b) comprises:
   (b1) searching for a break point located farthest from a line segment connecting a first end point and a second end point, among LiDAR points included in the $m^{th}$ layer; and
   (b2) assigning a shape flag to the $m^{th}$ layer using at least one of a first line segment connecting the first end point and the break point, a second line segment connecting the second end point and the break point, first LiDAR points located near the first line segment, or second LiDAR points located near the second line segment,
   wherein step (b2) comprises:
   analyzing distribution of the first LiDAR points and the second LiDAR points in the $m^{th}$ layer;
   determining whether the target object is a dynamic object or a static object by using a result of the analyzing distribution; and
   assigning a break flag to the $m^{th}$ layer as the shape flag to indicate that a possibility that the target object included in the $m^{th}$ layer is a dynamic object is low, and
   wherein the assigning the break flag to the $m^{th}$ layer comprises:
   calculating a first average value of first distances between the first line segment and the first LiDAR points;
   calculating a first variance of the first distances using the first average value;
   calculating a second average value of second distances between the second line segment and the second LiDAR points;
   calculating a second variance of the second distances using the second average value; and
   determining a lower probability that the target object is the dynamic object rather than the static object and assigning the break flag to the $m^{th}$ layer in response to a determination that each of the first variance and the second variance is greater than a variance threshold value.

2. The method according to claim 1, wherein step b2 further comprises:
   temporarily assigning an L-shaped flag or an I-shaped flag to the $m^{th}$ layer as the shape flag based on a size of a shape box of the $m^{th}$ layer comprising the first and second line segments when each of the first variance and the second variance is not greater than the variance threshold value; and
   finally assigning the L-shaped flag or the I-shaped flag to the $m^{th}$ layer using at least one of the first line segment, the second line segment, the first LiDAR points, or the second LiDAR points on the L-shaped flag or the I-shaped flag temporarily assigned to the $m^{th}$ layer.

3. The method according to claim 2, wherein the temporarily assigning the L-shaped flag or the I-shaped flag to the $m^{th}$ layer comprises:
   temporarily assigning the L-shaped flag or the I-shaped flag to the $m^{th}$ layer using at least one of a length or a width of the shape box.

4. The method according to claim 3, wherein the temporarily assigning the L-shaped flag or the I-shaped flag to the $m^{th}$ layer comprises:
   temporarily assigning the I-shaped flag to the $m^{th}$ layer when the width of the shape box falls within a first threshold width range; and
   temporarily assigning the L-shaped flag to the $m^{th}$ layer when the width of the shape box falls within a second threshold width range,
   wherein the first threshold width range has a range of a first minimum value to a first maximum value,
   wherein the second threshold width range has a range of a second minimum value to a second maximum value, and
   wherein the second minimum value is greater than or equal to the first maximum value.

5. The method according to claim 4, wherein the finally assigning the L-shaped flag to the $m^{th}$ layer comprises:
   selecting a longer line segment from among the first line segment and the second line segment as a reference line segment;
   selecting a shorter line segment from among the first line segment and the second line segment as a non-reference line segment; and
   finally assigning the L-shaped flag to the $m^{th}$ layer when a length of the reference line segment is greater than or equal to a threshold length, when an average and a variance of the reference line segment are less than a reference threshold average and a reference threshold variance, respectively, when an average and a variance of the non-reference line segment are less than a non-reference threshold average and a non-reference threshold variance, respectively, when LiDAR points are present in each of i (where i is a positive integer of 1 or more) regions formed by division in a direction intersecting the reference line segment, when a spacing distance between neighboring outer LiDAR points located in the regions is less than a threshold spacing distance, and when an angle between the first line segment and the second line segment is greater than a first angle and less than a second angle.

6. The method according to claim 5, further comprising:
   checking whether the $m^{th}$ layer is a layer related to a roof of the target object,
   wherein, when the $m^{th}$ layer is the layer related to the roof of the target object, the non-reference threshold average and the non-reference threshold variance are increased, and
   wherein the non-reference threshold average and the non-reference threshold variance are used to determine whether to finally assign the L-shaped flag to an $m+1^{th}$ layer.

7. The method according to claim 6, wherein the checking whether the mth layer is the layer related to the roof of the target object comprises:
   checking whether a first ratio of the length of the shape box of the $m^{th}$ layer to a length of a clustering box related to the target object is less than a first threshold ratio;

searching for a peak point in the shape flag finally assigned to the $m^{th}$ layer when the first ratio is less than the first threshold ratio; and determining that the $m^{th}$ layer is the layer related to the roof when a second ratio of a length from the peak point to a middle of the clustering box to half a length of the clustering box is less than a second threshold ratio.

8. The method according to claim 7, wherein the searching for the peak point comprises:

determining a LiDAR point located farthest from the shorter line segment among the first line segment and the second line segment to be the peak point when the L-shaped flag is finally assigned to the $m^{th}$ layer; and determining the break point to be the peak point when the I-shaped flag is finally assigned to the $m^{th}$ layer.

9. The method according to claim 4, wherein the finally assigning the I-shaped flag to the $m^{th}$ layer comprises:

selecting a longer line segment from among the first line segment and the second line segment as a reference line segment; and finally assigning the I-shaped flag to the $m^{th}$ layer when an average and a variance of the reference line segment are less than a reference threshold average and a reference threshold variance, respectively, and when a spacing distance between outer LiDAR points located in j (where j is a positive integer of 1 or more) regions formed by division in a direction intersecting the reference line segment is less than a threshold spacing distance.

10. The method according to claim 4, wherein the determining the shape of the target object according to the predetermined priority comprises:

determining that the shape of the target object is unrecognizable when there is a layer to which the break flag has been assigned among the first to $M^{th}$ layers;

determining that the shape of the target object is an L shape when there is no layer to which the break flag has been assigned and there is a layer to which the L-shaped flag has been assigned among the first to $M^{th}$ layers;

determining that the shape of the target object is an I shape when there is no layer to which any one of the break flag and the L-shaped flag has been assigned and there is a layer to which the I-shaped flag has been assigned among the first to $M^{th}$ layers; and determining that the shape of the target object is unrecognizable when there is no layer to which any one of the break flag, the L-shaped flag and the I-shaped flag has been assigned among the first to $M^{th}$ layers.

11. An apparatus for tracking a target object using a LiDAR sensor, the apparatus comprising:

the LiDAR sensor configured to acquire a point cloud comprising a plurality of points related to the target object;

a clustering unit configured to cluster the point cloud to generate clustered LiDAR points; and a shape analysis unit configured to analyze a shape of the target object using the clustered LiDAR points in the point cloud, wherein the shape analysis unit comprises:

a layer shape determination unit configured to determine shapes of all of first to $M^{th}$ layers (where M is a positive integer of 2 or more) related to the target object using the clustered LiDAR points; and a target shape determination unit configured to analyze the determined shapes according to a predetermined priority to determine the shape of the target object, wherein the layer shape determination unit determines a shape of an $m^{th}$ layer (where 1≤m≤M) among the first to $M^{th}$ layers, and wherein the layer shape determination unit comprises:

a determination preparation unit configured to search for a break point located farthest from a line segment connecting a first end point and a second end point, among LiDAR points included in the $m^{th}$ layer, and to generate a first line segment connecting the first end point and the break point and a second line segment connecting the second end point and the break point; and a flag assignment unit configured to assign a shape flag to the $m^{th}$ layer using at least one of the first line segment, the second line segment, first LiDAR points located near the first line segment, or second LiDAR points located near the second line segment, wherein the layer shape determination unit further comprises:

an object analysis unit configured to analyze distribution of the first LiDAR points and the second LiDAR points in the $m^{th}$ layer, determine whether the target object is a dynamic object or a static object by using a result of the analyzing distribution, and assign a break flag to the $m^{th}$ layer as the shape flag to indicate that a possibility that the target object included in the $m^{th}$ layer is a dynamic object is low, and wherein the object analysis unit comprises:

a first variance calculation unit configured to calculate a first variance of first distances between the first line segment and the first LiDAR points using a first average value of the first distances;

a second variance calculation unit configured to calculate a second variance of second distances between the second line segment and the second LiDAR points using a second average value of the second distances; and a variance comparison unit configured to compare each of the first variance and the second variance with a variance threshold value, determine a lower probability that the target object is the dynamic object rather than the static object, and assign the break flag to the $m^{th}$ layer in response to a result of comparison that each of the first variance and the second variance is greater than the variance threshold value.

12. The apparatus according to claim 11, wherein the flag assignment unit comprises:

a temporary flag assignment unit configured to temporarily assign an L-shaped flag or an I-shaped flag to the $m^{th}$ layer as the shape flag based on a size of a shape box of the $m^{th}$ layer comprising the first and second line segments in response to a result of comparison by the variance comparison unit; and a final flag assignment unit configured to finally assign the L-shaped flag or the I-shaped flag to the $m^{th}$ layer using at least one of the first line segment, the second line segment, the first LiDAR points, or the second LiDAR points on the L-shaped flag or the I-shaped flag temporarily assigned to the $m^{th}$ layer.

13. The apparatus according to claim 12, wherein the temporary flag assignment unit temporarily assigns the L-shaped flag or the I-shaped flag to the $m^{th}$ layer using at least one of a length or a width of the shape box.

14. The apparatus according to claim 13, wherein the temporary flag assignment unit comprises:

a first width comparison unit configured to compare the width of the shape box with a first threshold width range and to temporarily assign the I-shaped flag to the $m^{th}$ layer in response to a result of comparison; and a second width comparison unit configured to compare the width of the shape box with a second threshold width range and to temporarily assign the L-shaped flag to the $m^{th}$ layer in response to a result of comparison, wherein the first threshold width range has a range of a first minimum value to a first maximum value, wherein the second threshold width range has a range of a second minimum value to a second maximum value, and wherein the second minimum value is greater than or equal to the first maximum value.

15. The apparatus according to claim 14, wherein the final flag assignment unit comprises:

a reference line segment selection unit configured to select a longer line segment from among the first line segment and the second line segment as a reference line segment and to select a shorter line segment from among the first line segment and the second line segment as a non-reference line segment; and a first flag assignment analysis unit configured to finally assign the L-shaped flag to the $m^{th}$ layer when a length of the reference line segment is greater than or equal to a threshold length, when an average and a variance of the reference line segment are less than a reference threshold average and a reference threshold variance, respectively, when an average and a variance of the non-reference line segment are less than a non-reference threshold average and a non-reference threshold variance, respectively, when LiDAR points are present in each of i (where i is a positive integer of 1 or more) regions formed by division in a direction intersecting the reference line segment, when a spacing distance between neighboring outer LiDAR points located in the regions is less than a threshold spacing distance, and when an angle between the first line segment and the second line segment is greater than a first angle and less than a second angle.

16. The apparatus according to claim 15, wherein the final flag assignment unit further comprises:

a second flag assignment analysis unit configured to finally assign the I-shaped flag to the $m^{th}$ layer when an average and a variance of the reference line segment are less than a reference threshold average and a reference threshold variance, respectively, and when a spacing distance between outer LiDAR points located in j (where j is a positive integer of 1 or more) regions formed by division in a direction intersecting the reference line segment is less than a threshold spacing distance.

17. The apparatus according to claim 16, wherein the target shape determination unit comprises:

a first flag inspection unit configured to check whether there is a layer to which the break flag has been assigned among the first to $M^{th}$ layers;

a second flag inspection unit configured to check whether there is a layer to which the L-shaped flag has been assigned in response to a result of checking by the first flag inspection unit;

a third flag inspection unit configured to check whether there is a layer to which the I-shaped flag has been assigned in response to a result of checking by the second flag inspection unit; and a final shape output unit configured to determine the shape of the target object to be an unrecognizable shape, an L shape, or an I shape in response to results of checking by the first to third flag inspection units.

18. The apparatus according to claim 15, wherein the layer shape determination unit further comprises:

a roof layer inspection unit configured to check whether the $m^{th}$ layer is a layer related to a roof of the target object and to output a result of checking, and wherein the first flag assignment analysis unit increases the non-reference threshold average and the non-reference threshold variance in response to a result of checking by the roof layer inspection unit, the non-reference threshold average and the non-reference threshold variance being used to determine whether to finally assign the L-shaped flag to an $m+1^{th}$ layer.

19. The apparatus according to claim 18, wherein the roof layer inspection unit checks whether a first ratio of the length of the shape box of the $m^{th}$ layer to a length of a clustering box related to the target object is less than a first threshold ratio, searches for a peak point in the shape flag finally assigned to the $m^{th}$ layer, and checks whether a second ratio of a length from the peak point to a middle of the clustering box to half a length of the clustering box is less than a second threshold ratio.

20. The apparatus according to claim 19, wherein the roof layer inspection unit determines a LiDAR point located farthest from the shorter line segment among the first line segment and the second line segment to be the peak point, or determines the break point to be the peak point in response to a result of comparison between the first ratio and the first threshold ratio and a result of final assignment of the shape flag by the final flag assignment unit.

* * * * *